(12) United States Patent
Agetsuma et al.

(10) Patent No.: US 10,788,996 B2
(45) Date of Patent: Sep. 29, 2020

(54) COMPUTER SYSTEM AND PROCESS EXECUTION METHOD

(71) Applicant: Hitachi, Ltd., Tokyo (JP)

(72) Inventors: Masakuni Agetsuma, Tokyo (JP); Hiroaki Akutsu, Tokyo (JP); Yusuke Nonaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 113 days.

(21) Appl. No.: 15/552,616

(22) PCT Filed: Mar. 25, 2015

(86) PCT No.: PCT/JP2015/059244
§ 371 (c)(1),
(2) Date: Aug. 22, 2017

(87) PCT Pub. No.: WO2016/151821
PCT Pub. Date: Sep. 29, 2016

(65) Prior Publication Data
US 2018/0024766 A1 Jan. 25, 2018

(51) Int. Cl.
G06F 12/02 (2006.01)
G06F 3/06 (2006.01)
G06F 13/10 (2006.01)
G06F 11/30 (2006.01)
G06F 11/34 (2006.01)
G06F 9/50 (2006.01)
G06F 12/06 (2006.01)

(52) U.S. Cl.
CPC .......... *G06F 3/0631* (2013.01); *G06F 9/5016* (2013.01); *G06F 11/3024* (2013.01); *G06F 11/34* (2013.01); *G06F 11/3442* (2013.01); *G06F 11/3466* (2013.01); *G06F 12/063* (2013.01); *G06F 13/10* (2013.01); *G06F 3/0658* (2013.01)

(58) Field of Classification Search
None
See application file for complete search history.

(56) References Cited

U.S. PATENT DOCUMENTS

2017/0075828 A1* 3/2017 Monji ................. G06F 13/1668

FOREIGN PATENT DOCUMENTS

JP 2007-200347 A 8/2007
JP 2012-073660 A 4/2012

OTHER PUBLICATIONS

International Search Report and Written Opinion for PCT App No. PCT/JP2015/059244 dated May 19, 2015, 8 pgs.

* cited by examiner

Primary Examiner — Charles Rones
Assistant Examiner — Ryan Dare
(74) Attorney, Agent, or Firm — Procopio, Cory, Hargreaves & Savitch LLP

(57) ABSTRACT

The present invention effectively utilizes computation resources by allocating the computation resources, in accordance with conditions, to a process that shares a computation resource with another process and a process that occupies a computation resource. Execution control causes a processor core allocated to a storage control process to be occupied by the storage control process, the execution control causes a processor core allocated to an application process to be shared with another process, and the execution control changes the number of processor cores allocated to the storage control process on the basis of I/O information indicating a state of an I/O.

17 Claims, 36 Drawing Sheets

FIG.7

CPU load management table 700

| Core ID | Load |
|---------|------|
| 0 | 100% |
| 1 | 100% |
| 2 | 15% |
| 3 | 10% |

Process management table    800

| Process ID | Type | State | Core ID | Time slice |
|---|---|---|---|---|
| 1000 | Standard | Executing | 3 | 1 ms |
| 1010 | Standard | I/O pending | - | 2 ms |
| 1020 | Standard | Execution pending | - | 0 ms |
| 1030 | Standard | Executing | 2 | 5 ms |
| 3100 | Real-time | Executing | 0 | - |
| 3101 | Real-time | Executing | 1 | - |
| ... | | | | |

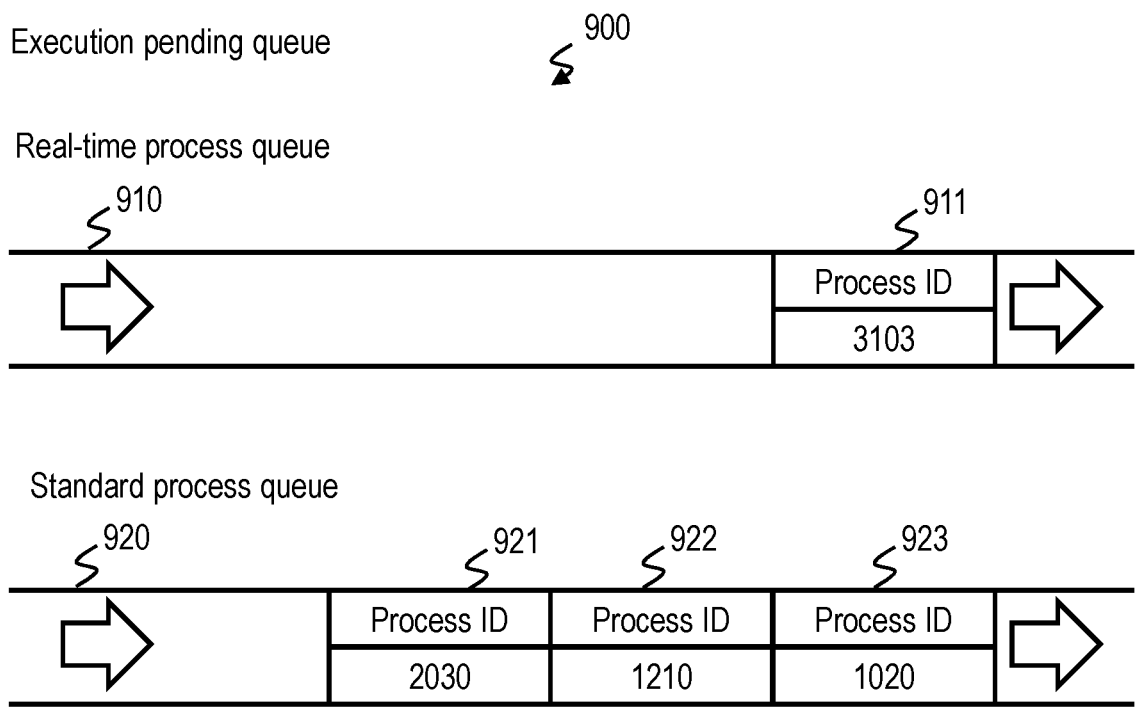

FIG.10

Storage process management table

1000A

| Process ID | Mode | Processing load | Write Pending rate | Response time |
|---|---|---|---|---|
| 3100 | Occupied | 50% | 10% | 1 ms |
| 3101 | Occupied | 40% | 20% | 1 ms |
| - | - | - | - | - |
| - | - | - | - | - |

1000B

| Process ID | Mode | Processing load | Write Pending rate | Response time |
|---|---|---|---|---|
| 3100 | Shared | 10% | 10% | 1 ms |
| - | - | - | - | - |
| - | - | - | - | - |
| - | - | - | - | - |

FIG.11

Core increase/decrease policy management table

1100

| Policy item | Upper limit | Lower limit |
|---|---|---|
| Average processing load | 80% | 20% |
| Average Write Pending rate | 70% | - |
| Average response time | 5 ms | - |

1111 1112 1113

1121 — Average processing load
1122 — Average Write Pending rate
1123 — Average response time

FIG.12

Allocated core number management table

1200A

| 1211 | 1212 | 1213 | 1214 |
|---|---|---|---|
| Total number of cores | Minimum number of occupied cores | Maximum number of occupied cores | Maximum number of shared cores |
| 4 | 1 | 3 | 0 |

1200B

| 1211 | 1212 | 1213 | 1214 |
|---|---|---|---|
| Total number of cores | Minimum number of occupied cores | Maximum number of occupied cores | Maximum number of shared cores |
| 4 | 0 | 3 | 1 |

FIG.18

■ Core increase/decrease policy configuration unit 1910

| Policy item | Upper limit | Lower limit |
|---|---|---|
| Average core utilization | 80% | 20% |
| Average Write Pending rate | 70% | - |
| Average response performance | 5 ms | - |

1111, 1112, 1113

■ Allocated core number configuration unit 1920

| Total number of cores | Minimum number of occupied cores | Maximum number of occupied cores | Maximum number of shared cores |
|---|---|---|---|
| 4 | 1 | 3 | 0 |

1211, 1212, 1213, 1214

Update (1930)  Cancel (1940)

Configuration window (1900)

FIG.7

CPU load management table  700

| Core ID | Load |
|---------|------|
| 0 | 100% |
| 1 | 100% |
| 2 | 15% |
| 3 | 10% |

FIG.8

Process management table  800

| Process ID | Type | State | Core ID | Time slice |
|---|---|---|---|---|
| 1000 | Standard | Executing | 3 | 1 ms |
| 1010 | Standard | I/O pending | - | 2 ms |
| 1020 | Standard | Execution pending | - | 0 ms |
| 1030 | Standard | Executing | 2 | 5 ms |
| 3100 | Real-time | Executing | 0 | - |
| 3101 | Real-time | Executing | 1 | - |
| ... | | | | |

FIG.10

Storage process management table

1000A

| Process ID | Mode | Processing load | Write Pending rate | Response time |
|---|---|---|---|---|
| 3100 | Occupied | 50% | 10% | 1 ms |
| 3101 | Occupied | 40% | 20% | 1 ms |
| - | - | - | - | - |
| - | - | - | - | - |

1000B

| Process ID | Mode | Processing load | Write Pending rate | Response time |
|---|---|---|---|---|
| 3100 | Shared | 10% | 10% | 1 ms |
| - | - | - | - | - |
| - | - | - | - | - |
| - | - | - | - | - |

FIG.11

Core increase/decrease policy management table

1100

| Policy item | Upper limit | Lower limit |
|---|---|---|
| Average processing load | 80% | 20% |
| Average Write Pending rate | 70% | - |
| Average response time | 5 ms | - |

1111, 1112, 1113 (column headers); 1121, 1122, 1123 (rows)

FIG.12

Allocated core number management table

1200A

| Total number of cores (1211) | Minimum number of occupied cores (1212) | Maximum number of occupied cores (1213) | Maximum number of shared cores (1214) |
|---|---|---|---|
| 4 | 1 | 3 | 0 |

1200B

| Total number of cores (1211) | Minimum number of occupied cores (1212) | Maximum number of occupied cores (1213) | Maximum number of shared cores (1214) |
|---|---|---|---|
| 4 | 0 | 3 | 1 |

FIG.18

■Core increase/decrease policy configuration unit

| Policy item | Upper limit | Lower limit |
|---|---|---|
| Average core utilization | 80% | 20% |
| Average Write Pending rate | 70% | - |
| Average response performance | 5 ms | - |

■Allocated core number configuration unit

| Total number of cores | Minimum number of occupied cores | Maximum number of occupied cores | Maximum number of shared cores |
|---|---|---|---|
| 4 | 1 | 3 | 0 |

Update  Cancel

COMPUTER SYSTEM AND PROCESS EXECUTION METHOD

CROSS-REFERENCE TO RELATED APPLICATIONS

This application is a U.S. National Stage entry of PCT Application No: PCT/JP2015/059244 filed Mar. 25, 2015, the contents of which are incorporated herein by reference.

TECHNICAL FIELD

The present invention relates to a computer system.

BACKGROUND ART

There are programs which perform processing for acquiring (reaping) an I/O request by polling and which perform I/O processing in accordance with the I/O request. Such programs are capable of maintaining response performance and throughput performance at high levels. However, with polling, since repetitively determining whether or not an I/O request arrives until the I/O request finally arrives occupies a computation resource such as a CPU core, a load on the CPU core is constantly at around 100%.

On the other hand, since ordinary application programs are premised on the use of a CPU core by a plurality of programs in a shared manner, when event pending such as I/O pending occurs during processing, either the CPU core is temporarily released or an execution authority thereof is transferred to another program. Since such programs do not occupy a CPU core unlike polling, the load on the CPU core can be suppressed. However, with such programs, response performance and throughput performance cannot be maintained at high levels.

PTL 1 describes a technique which involves measuring a CPU load of an OS (Operating System) running on virtual hardware (LPAR: Logical Partition) created by logically partitioning a hardware resource and automatically optimizing an allocation of a computation resource of each LPAR.

Let us consider applying this technique to a computer system which executes both a polling program and a general application program to allocate a computation resource of the computer system. In this case, since the polling causes the CPU load to be kept around 100%, when a computation resource is allocated based on the CPU load, there is a possibility that the computation resource ends up being added to the polling program even when the polling program is not performing I/O processing.

CITATION LIST

Patent Literature

[PTL 1]
Japanese Patent Application Publication No. 2007-200347

SUMMARY OF INVENTION

Technical Problem

When a computer system executes a process which shares a computation resource with another process and a process which occupies a computation resource, it is difficult to allocate computation resources to these processes so as to maintain performance.

Solution to Problem

In order to solve the problem described above, a computer system according to an aspect of the present invention includes: a memory; a plurality of processor cores coupled to the memory; and a storage device coupled to the plurality of processor cores. The memory is configured to store: a storage control program which causes at least one of the plurality of processor cores to execute a storage control process in which an I/O is executed with respect to the storage device in accordance with an I/O request; an application program which causes at least one of the plurality of processor cores to execute an application process in which the I/O request is issued; and an execution control program which causes at least one of the plurality of processor cores to execute execution control in which at least one of the plurality of processor cores is allocated to each of the storage control process and the application process. The execution control causes a processor core allocated to the storage control process to be occupied by the storage control process, the execution control causes a processor core allocated to the application process to be shared with another process, and the execution control changes the number of processor cores allocated to the storage control process, based on I/O information indicating a state of the I/O.

Advantageous Effects of Invention

By allocating computation resources in accordance with states to a process which shares a computation resource with another process and a process which occupies a computation resource, the computation resources can be utilized in an effective manner.

BRIEF DESCRIPTION OF DRAWINGS

FIG. 7 shows a CPU load management table 700.
FIG. 8 shows a process management table 800.
FIG. 10 shows a storage process management table 1000.
FIG. 11 shows a core increase/decrease policy management table 1100.
FIG. 12 shows an allocated core number management table 1200.
FIG. 18 shows a GUI for configuration.

DESCRIPTION OF EMBODIMENTS

Figure 1:
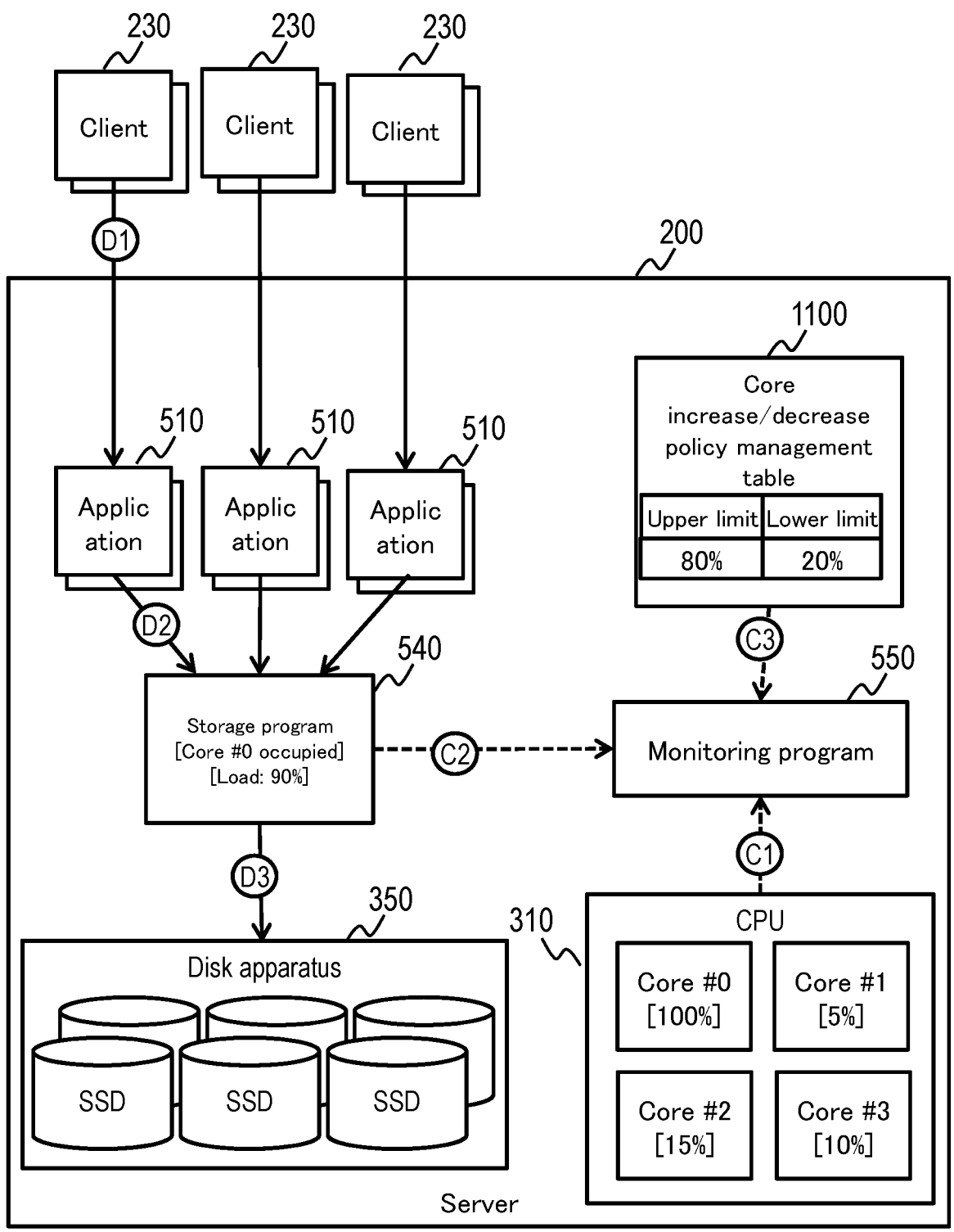
FIG. 1 shows a first state of a server according to an embodiment.

Hereinafter, an embodiment of the present invention will be described with reference to the drawings. For the purpose of clarification, the following description and the accompanying drawings have been abridged and/or simplified as appropriate. It is to be understood that the present invention is not limited to the present embodiment and that all modifications conforming to the spirit of the present invention are to be included in the technical scope of the present invention. Unless particular limitations are applied, each component may be provided in plurality or provided singularly.

Although various types of information will be described below using expressions such as an "xxx table", the various types of information may be expressed by data structures other than a table. An "xxx table" may be referred to as "xxx information" in order to demonstrate that the various types of information are not dependent on data structure.

A management system can be constituted by one or more computers. For example, when a management computer processes and displays information, the management computer constitutes a management system. In addition, for example, when functions identical or similar to those of a management computer are realized by a plurality of computers, the plurality of computers (when a display computer performs display, the display computer may be included) constitute a management system. In the present embodiment, a management computer constitutes a management system.

While a "program" is sometimes used as a subject when describing processing in the following description, since a program causes prescribed processing to be performed by appropriately using a storage resource (such as a memory) and/or a communication interface apparatus (such as a communication port) when being executed by a processor (such as a CPU (Central Processing Unit)), a "processor" may be used instead as a subject of processing. When a processor operates in accordance with a program, the processor operates as functional units which realize prescribed functions. An apparatus and a system which include a processor are an apparatus and a system which include these functional units.

Processing described using a program or a processor as a subject can be described using a computer (for example, a storage system, a management computer, a client, or a host) as a subject. A processor may include a hardware circuit which performs a part of or all of the processing to be performed by the processor. A computer program may be installed to each computer from a program source. The program source may be, for example, a program distribution server (for example, a management computer) or a storage medium.

Moreover, when two elements distinguished by alphabetical characters suffixed to a reference numeral need not be distinguished from each other, the alphabetical characters may be omitted.

FIG. 1 shows a first state of a server according to an embodiment.

A server 200 is coupled to a plurality of clients 230. The server 200 includes a CPU 310 and a disk apparatus 350. The CPU 310 includes a plurality of CPU cores #0, #1, #2, and #3. Moreover, a CPU core may be referred to as a core or a processor core and a disk apparatus may be referred to as a storage device.

The server 200 stores a plurality of application programs 510, a storage program 540, a monitoring program 550, and a core increase/decrease policy management table 1100. Each of the plurality of application programs 510, the storage program 540, and the monitoring program 550 run using at least one of the plurality of cores. The plurality of application programs 510 provide the plurality of clients 230 with services.

The first state represents a flow of data in the server 200, a role of the storage program 540, and an operation of monitoring a load on the server 200 by the monitoring program 550. In the diagram, solid lines depict a flow of data and a dashed line depicts a flow of control information.

Steps D1 to D3 represent a flow of data when the client 230 issues a request to the application program 510.

(Step D1) The client 230 transmits a request to the application program 510 running on the server 200.

(Step D2) The application program 510 having received the request from the client 230 performs processing based on the request and, when the processing requires accessing the disk apparatus 350, issues an I/O request to the storage program 540.

(Step D3) Based on the I/O request from the application program 510, the storage program 540 performs I/O processing which is either a data read from the disk apparatus 350 or a data write to the disk apparatus 350. Moreover, I/O processing may also be referred to as an I/O.

In order to immediately acquire the I/O request from the application program 510, the storage program 540 occupies a computation resource and performs polling which repetitively checks whether or not the I/O request has arrived. The computation resource according to the present embodiment is a core of the CPU 310. Moreover, another program which performs polling by occupying a computation resource and repetitively checking whether or not the I/O request has arrived may be used in place of the storage program.

In order to increase speed, redundancy, and reliability, the storage program 540 uses RAID technology to provide the application program 510 or the client 230 with a plurality of disks such as an SSD (Solid State Drive) or a SATA (Serial ATA) disk in the disk apparatus 350 as one or more virtual disks. In addition, in order to reduce bit cost, the storage program 540 automatically selectively uses storage destinations such as an SSD with high performance but a high bit cost and an SATA disk with low performance but a low bit cost in accordance with access frequency to data. Furthermore, from the perspectives of data protection and disaster recovery, the storage program 540 communicates with a storage program 540 on another server 200 to duplicate data.

According to the processing described above, by accessing data via the storage program 540, the application program 510 can enjoy benefits equal to or greater than when the application program 510 directly accesses the disk apparatus 350.

Steps C1 to C4 represent an operation in which the load on the server 200 is monitored by the monitoring program 550 and an operation in which, based on a result of the monitoring, the number of cores occupied by the storage program 540 is increased. A numerical value attached to each core presents a load [%] on the core.

(Step C1) The monitoring program 550 collects information on the load on each core of the CPU 310. In the first state, since the core #0 is occupied by polling of the storage program 540, the load on the core #0 is apparently constantly close to 100%. The core #1, the core #2, and the core #3 are used by the application program 510 and the monitoring program 550. In the first state, the load on the core #0 is 100%, the load on the core #1 is 5%, the load on the core #2 is 15%, and the load on the core #3 is 10%.

(Step C2) The monitoring program 550 acquires information on a processing load which represents a load applied by I/O processing of the storage program 540. In the first state, although the load on the core #0 is 100%, processing load among the load is 90%. Moreover, a processing load may also be referred to as an I/O load.

(Step C3) The monitoring program 550 refers to the core increase/decrease policy management table 1100 and confirms that an upper limit of a processing load is 80% and a lower limit thereof is 20%.

Figure 2:
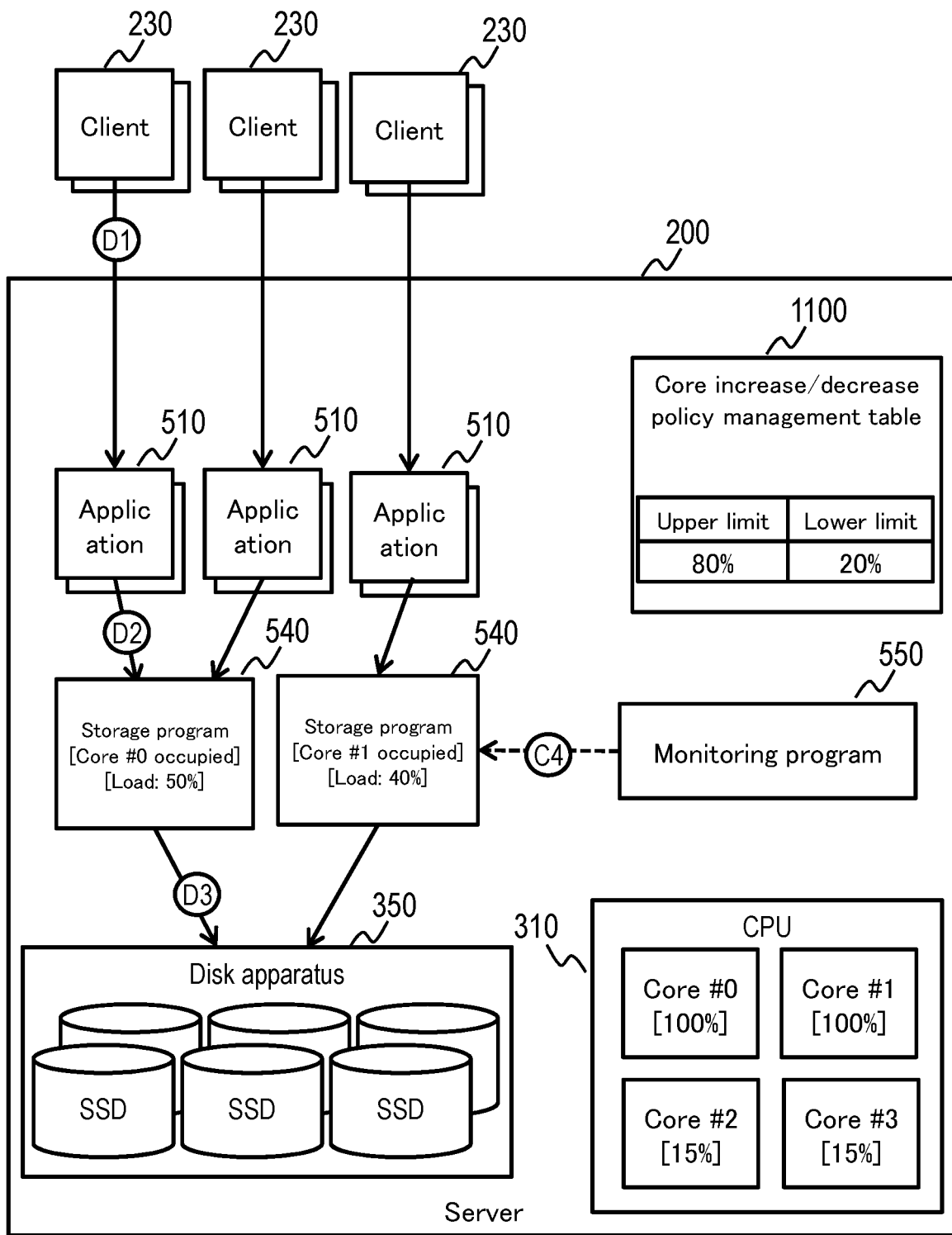
FIG. 2 shows a second state of a server according to an embodiment.

FIG. 2 shows a second state of a server according to the embodiment.

The second state represents a situation where, based on a result of monitoring, the monitoring program 550 increases a computation resource of the storage program 540.

(Step C4) Based on results of steps C1 to C3, the monitoring program 550 determines that the processing load of the storage program 540 occupying the core #0 is 90% and is higher than the upper limit of 80%. In addition, the monitoring program 550 determines that, even if cores occupied by the storage program 540 are to be increased, the remaining cores are capable of withstanding loads applied by the application program 510 and the monitoring program 550. The monitoring program 550, based on a result of the determinations, the monitoring program 550 determines to increase the number of cores of the storage program and starts a process of the storage program 540 occupying the core #1.

The storage program 540 occupying the core #0 and the storage program 540 occupying the core #1 respectively monitor an I/O request from the application program 510 by polling, acquire an arrived I/O request, and perform I/O processing based on the acquired I/O request.

Due to the flow described above, as represented by the second state, a processing load can be distributed between the storage program 540 occupying the core #0 and the storage program 540 occupying the core #1. Accordingly, performance of I/O processing can be improved. In addition, by measuring a processing load with respect to I/O processing of the core #0 instead of a load on the core #0, the server 200 can allocate an appropriate number of cores to the process of the storage program 540 based on the processing load.

Programs which perform polling such as a storage program run while occupying a core and a load on the core is constantly around 100%. When the storage program 540 performing polling and the application program 510 are to coexist in the same server 200, a determination of how many cores are to be allocated to the storage program 540 cannot be made by simply monitoring the loads on the cores. In consideration thereof, in the present embodiment, the number of cores occupied by the storage program 540 is dynamically increased or reduced based on information indicating an actual state of I/O processing as measured by the storage program 540 in addition to the loads on the cores.

According to the present embodiment, in a system in which the storage program 540 and other programs such as the application program 510 coexist in the same server 200, a preliminary design of core number allocation need not be performed. In addition, even if a preliminary design of allocation of computation resources is not performed, the storage program 540 and general applications can coexist in a same server computer without impairing a response performance and a throughput performance of the server 200. Furthermore, by minimizing the number of cores occupied by the storage program 540, costs related to an amount of used power and the like of the server 200 can be reduced.

Figure 3:
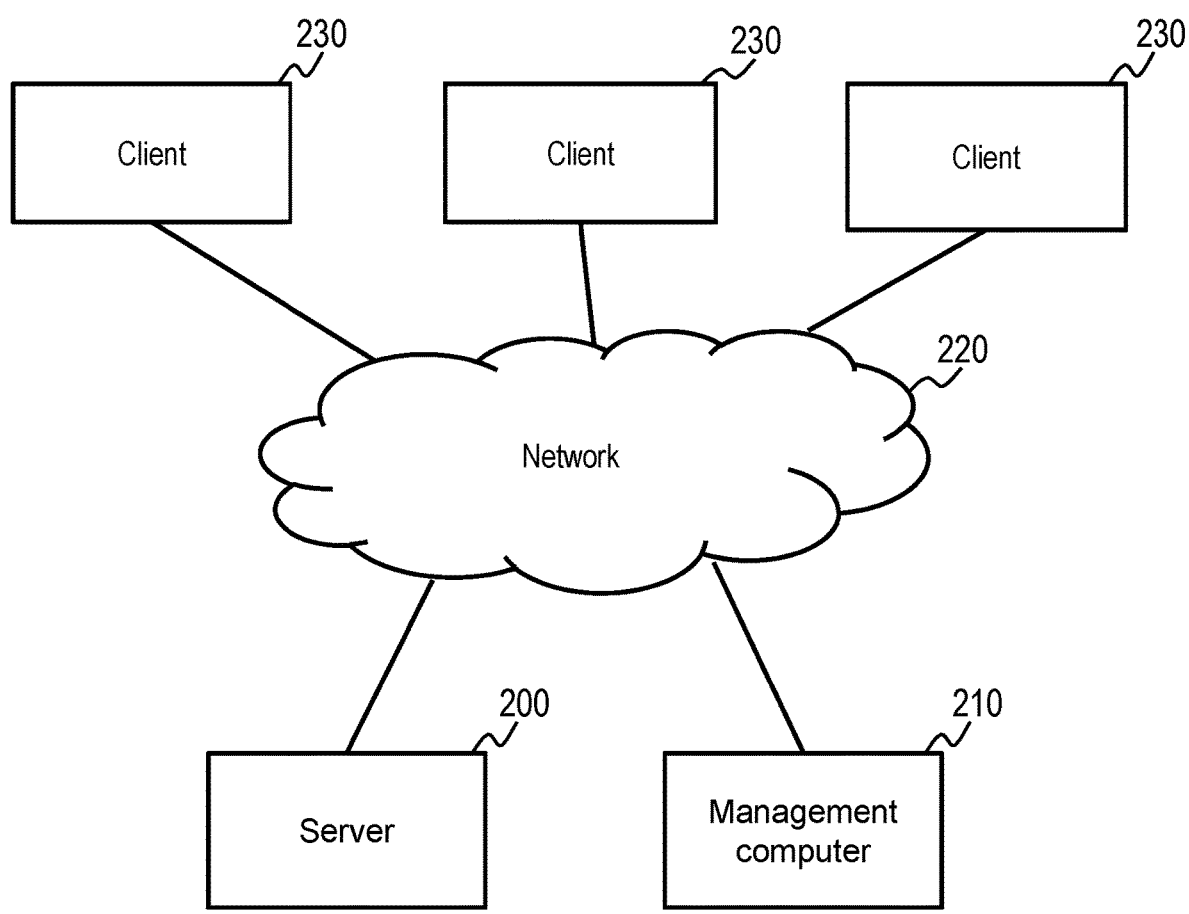
FIG. 3 shows a configuration of a computer system.

FIG. 3 shows a configuration of a computer system.

The computer system includes the server 200, a network 220, a management computer 210, and the client 230.

The server 200 is coupled via the network 220 to one or more management computers 210 and one or more clients 230.

The server 200 may be capable of processing a plurality of data communication protocols. For example, the server 200 performs data communication with the management computer 210 and the client 230 using data communication protocols such as FCP (Fibre Channel Protocol), iSCSI (Internet Small Computer System Interface), FCoE (Fibre Channel over Ethernet (registered trademark)), NFS (Network File System), CIFS (Common Internet File System), FTP (File Transfer Protocol), and HTTP (Hyper Text Transfer Protocol).

For example, the server 200 receives an I/O request from the client 230 via the network 220 and returns a processing result thereof to the client 230.

The server 200 may be configured to be fixed to a facility such as a data center or may be movably configured with a container shape or the like so that a physical position thereof is variable. In addition, the server 200 may include a plurality of mutually different computers.

For example, the network 220 may be any communication network such as the Internet, a LAN (Local Area Network), a WAN (Wide Area Network), a SAN (Storage Area Network), a public wireless LAN, and a mobile phone communication network. In addition, the network 220 may include a plurality of mutually different communication networks.

The client 230 may be configured to be fixed to a facility such as a data center or may be movably configured with a container shape or the like so that a physical position thereof is variable. For example, the client 230 may be a mobile phone such as a smart phone, a tablet terminal, a laptop computer, or a general-purpose computer. In addition, the client 230 may include a plurality of mutually different computers.

Alternatively, a storage system may be used in place of the server 200.

Figure 4:
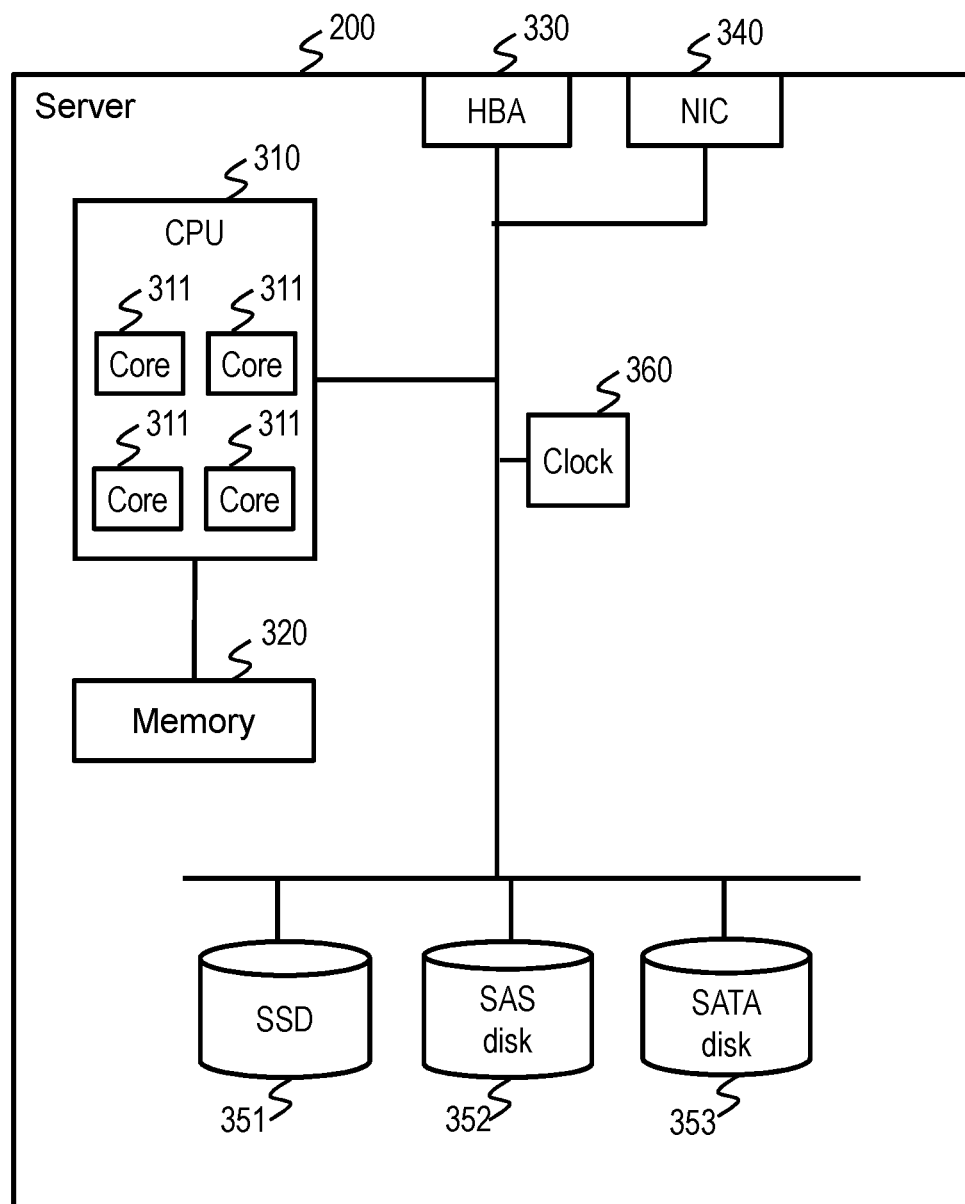
FIG. 4 shows a configuration of a server 200.

FIG. 4 shows a configuration of the server 200.

The server 200 includes a memory 320, an HBA (Host Bus Adaptor) 330, an NIC (Network Interface Card) 340, an SSD (Solid State Drive) 351, an SAS (Serial Attached SCSI) disk 352, an SATA (Serial ATA) disk 353, a Clock 360, and a CPU 310. The respective elements of the server 200 are coupled to each other via a bus. A storage resource of another type may be adopted in place of, or in addition to, the memory 320. A communication interface device of another type may be adopted in place of the HBA 330 or the NIC 340. The server 200 need not include any one of the HBA 330 and the NIC 340.

The CPU 310 executes processing in accordance with a computer program stored in the memory 320. The CPU 310 includes a plurality of cores 311. Each core 311 is a computing unit and is capable of running independently. The plurality of cores 311 can execute processing in parallel.

The memory 320 stores computer programs as well as other data. In addition, the memory 320 may include a cache area which temporarily stores data received from the client 230 and data to be transmitted to the client 230. The memory 320 may also include a cache area which temporarily stores files received from the client 230 and files to be transmitted to the client 230.

The HBA 330 is coupled to the network 220 that is a SAN. The NIC 205 is coupled to the network 220 that is a LAN, a WAN, or the Internet. The HBA 330 and the NIC 205 are used for data communication with the management computer 210 and the client 230.

The SSD 351, the SAS disk 352, and the SATA disk 353 are secondary storage devices of the server 200. The respective numbers of the SSD 351, the SAS disk 352, and the SATA disk 353 are not limited to the numbers depicted in the diagram. In addition, while disks are typically the SSD 351, the SAS disk 352, and the SATA disk 353, any storage medium capable of storing data in a block format may suffice. Disks may include a tape archive or an optical disk library such as a DVD or a CD. When a tape archive or an optical disk library is used, while I/O performance may decline, a bit cost can be reduced as compared to cases where an SSD or an HDD is used.

Hereinafter, the SSD 351, the SAS disk 352, and the SATA disk 353 will be collectively referred to as a disk apparatus.

The Clock 360 regularly issues an interrupt.

Figure 5:
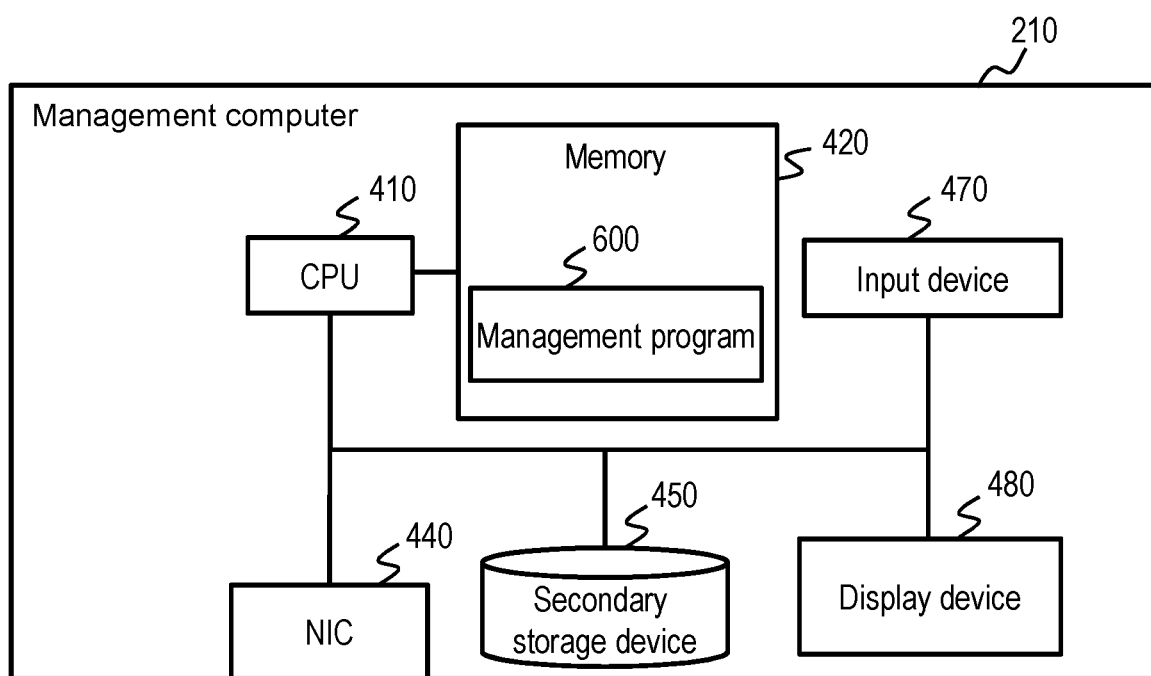
FIG. 5 shows a configuration of a management computer 210.

FIG. 5 shows a configuration of the management computer 210.

The management computer 210 includes a memory 420, an NIC 440, a secondary storage device 450, an input device 470, a display device 480, and a CPU 410 coupled to these elements. A storage resource of another type may be adopted in place of at least one of the memory 420 and the secondary storage device 450. A communication interface device of another type may be adopted in place of the NIC 440.

A computer program is loaded from the secondary storage device 450 to the memory 420. The CPU 410 executes processing in accordance with the computer program stored in the memory 420. The input device 470 is a device to be manipulated by a manager and is, for example, a keyboard and a pointing device. The NIC 440 is coupled to the network 220. The secondary storage device 450 is a disk such as an SSD, an SAS, or an SATA. The display device 480 is, for example, a liquid crystal display.

Software of the management computer 210 includes a management program 600. The management program 600 is loaded from the secondary storage device 450 to the memory 420 and stored in the memory 420.

The management program 600 provides the manager with a GUI (Graphical User Interface) or a CLI (Command Line Interface) for managing the server 200. The management program 600 causes the GUI or the CLI to be displayed on the display device 480 and accepts input to the input device 470. When the manager updates configurations using the GUI or the CLI, the management program 600 communicates with the server 200 and updates the core increase/decrease policy management table 1100 or the allocated core number management table 1200 of the server 200. Accordingly, the management computer 210 can perform management of a core allocation policy, management of the number of allocated cores, and the like in accordance with manipulations by the manager.

Alternatively, the computer system need not include the management computer 210. In this case, the server 200 may include an input device and a display device, the memory 320 of the server 200 may store a management program, and a GUI or a CLI may be provided in accordance with the management program.

Figure 6:
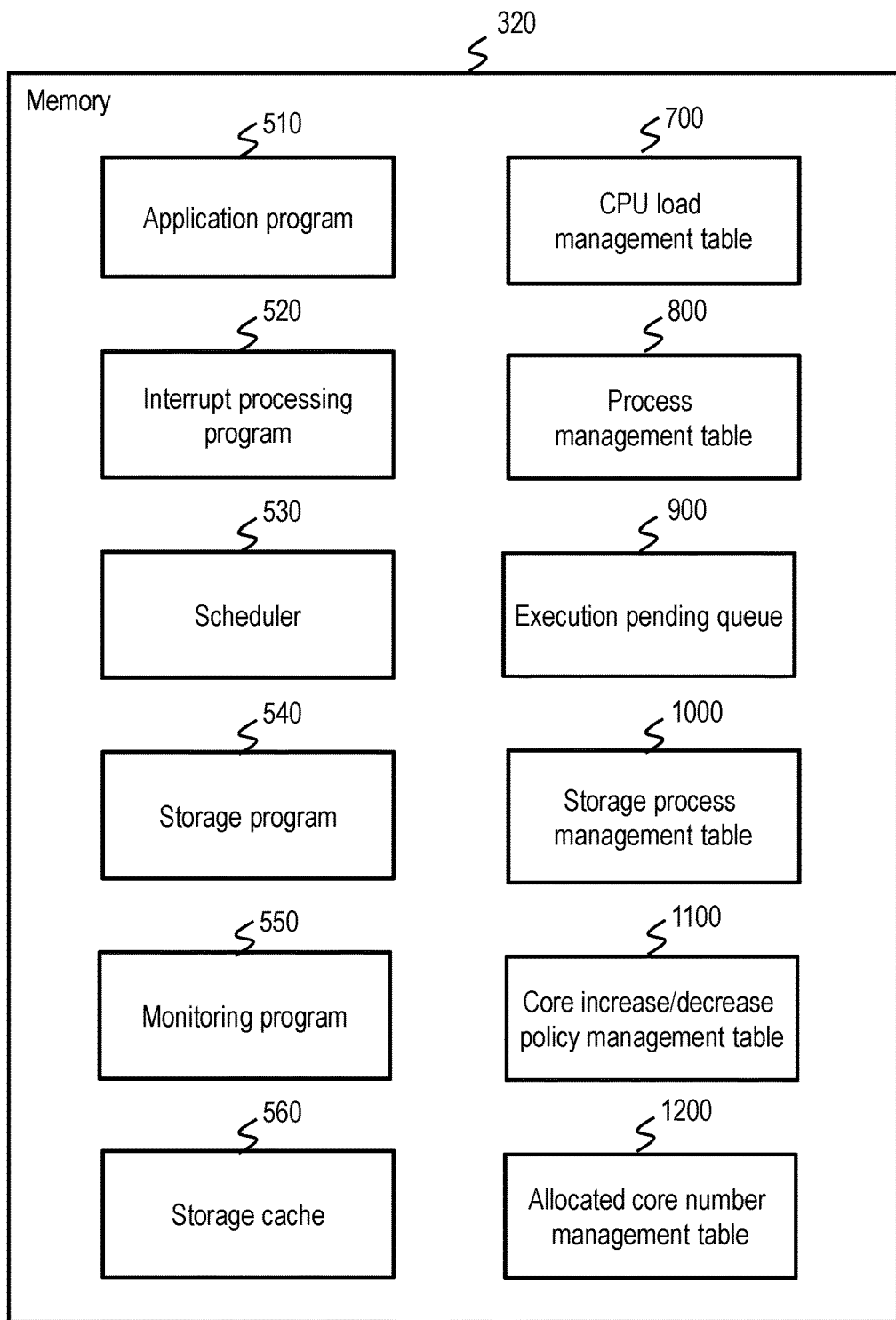
FIG. 6 shows information stored in a memory 320.

FIG. 6 shows information stored in the memory 320.

Software of the server 200 includes the application program 510, an interrupt processing program 520, a scheduler 530, the storage program 540, the monitoring program 550, a CPU load management table 700, a process management table 800, an execution pending queue 900, a storage process management table 1000, the core increase/decrease policy management table 1100, the allocated core number management table 1200, and a storage cache 560. These pieces of software are loaded from a disk apparatus such as the SSD 351, the SAS disk 352, and the SATA disk 353 to the memory 320 and stored in the memory 320. Each program in the memory 320 causes an allocated core 311 to execute a process.

The application program 510 communicates with the client 230 using a communication protocol such as NFS, CIFS, FTP, and HTTP. The application program 510 issues, in accordance with a request from the client 230, an I/O request for data to the storage program 540.

While a single application program 510 is stored in the memory 320 shown in FIG. 6, the number of application program 510 is not limited to one. For example, the memory 320 may include a plurality of application programs 510 of a different type for each communication protocol or may include a plurality of application programs 510 of a same type.

The interrupt processing program 520 is a program which receives and processes I/O interrupts issued by the HBA 330, the NIC 340, a disk apparatus, or the like and interrupts regularly issued by the Clock 360. In addition, after the processing, the interrupt processing program 520 calls the scheduler 530.

The scheduler 530 is a program which is executed with the interrupt processing program 520 as a trigger and which allocates the core 311 to each process waiting (sleeping) for a computation resource in the execution pending queue 900.

The storage program 540 executes I/O processing in accordance with an I/O request from the application program 510 or an I/O request directly received from the client 230 via a communication protocol such as FCP or iSCSI. The I/O processing writes data into a disk apparatus using the storage cache 560 or reads data from the disk apparatus using the storage cache 560. Moreover, the I/O processing may execute a read or write of data with respect to the disk apparatus without using the storage cache 560.

In the present embodiment, data received or transmitted by the storage program 540 is block data specified in a block address format.

The storage cache 560 is used to temporarily store block data to be written to a disk apparatus or block data read from the disk apparatus. In the following description, a virtual disk provided by the storage program 540 will be referred to as a volume. In addition, the application program 510 or the client 230 writing block data into a volume means that the storage program 540 writes the block data into the storage cache 560 or the disk apparatus. In a similar manner, the application program 510 or the client 230 reading block data from a volume means that the storage program 540 reads the block data from the storage cache 560 or the disk apparatus.

For example, when the storage program 540 receives a write request to write data into a volume from the application program 510 or the client 230, after temporarily writing data into the storage cache 560 with a high access speed, the storage program 540 notifies the application program 510 or the client 230 of a write completion. In addition, by having the storage program 540 write data stored in the storage cache 560 into a disk apparatus asynchronously with the write request, I/O performance is improved even when performance of the disk apparatus is lower than that of the storage cache 560.

In the present embodiment, in order to realize high response performance and throughput performance, the storage program 540 performs polling which involves continuously determining whether or not an I/O request has arrived and acquiring the I/O request.

The monitoring program 550 is a program which regularly monitors the CPU load management table 700, the process management table 800, the storage process management table 1000, the core increase/decrease policy management table 1100, and the allocated core number management table and which, in accordance with the situation, increases or reduces the number of cores 311 used by the storage program 540.

As described earlier, the storage cache 560 is used to temporarily store data to be written to a disk apparatus or block data read from the disk apparatus. Moreover, while the storage cache 560 is located inside the memory 320 in the present embodiment, the storage cache 560 is not limited to this mode. For example, from the perspective of failure tolerance, the storage cache 560 may be stored in a non-volatile semiconductor memory separate from the storage program 540. In addition, a storage device with a lower speed than a semiconductor memory may be used as a part of the storage cache 560.

The CPU load management table 700 stores load information on each core 311 in the CPU 310.

The process management table 800 is a table which manages states of the application program 510, the storage program 540, and the monitoring program 550 which are running in the server 200. For example, the process management table 800 manages whether a type of a process being executed is a standard process or a real-time process. In addition, the process management table 800 manages whether or not a process is being executed using a computation resource (the core 311).

The execution pending queue 900 is a FIFO (First In First Out) data structure for recording a process waiting its turn to become an allocation destination of the core 311.

The storage process management table 1000 is a table which manages a state of a process of the storage program 540 being executed. For example, the storage process management table 1000 stores a processing load, an amount of write pending data, and the like of a process being executed. A process of the storage program 540 may be referred to as a storage process or a storage control process.

The core increase/decrease policy management table 1100 is a table which manages a policy for increasing or reducing cores to be occupied by the storage program 540.

The allocated core number management table 1200 is a table which manages computation resources in the server 200. The allocated core number management table 1200 manages the number of cores occupied by the storage program 540 and the number of cores shared by the storage program 540 and the application program 510 among the plurality of cores in the CPU 310.

FIG. 7 shows the CPU load management table 700.

The CPU load management table 700 has an entry for each core 311. Each entry includes a core ID 711 and a load 712.

The core ID 711 represents a unique ID for identifying a single core in the server 200. The load 712 indicates how much of the computation resource of each core 311 is being used.

For example, an entry 721 corresponding to a single core indicates that the core ID 711 of the core 311 is "0" and the load 712 on the core 311 is "100%". In addition, an entry 723 corresponding to another core indicates that the core ID 711 of the core 311 is "2" and the load 712 on the core 311 is "15%".

Moreover, a core with a core ID of i may be referred to as a core #i. The load 712 may be referred to as a core load.

With a core 311 on which a program performing polling such as the storage program 540 according to the present embodiment runs, the load 712 on the core 311 is to constantly remain close to 100% as indicated by the entries 721 and 722.

FIG. 8 shows the process management table 800.

The process management table 800 has an entry for each process. Each entry includes a process ID 811, a type 812, a state 813, a core ID 814, and a time slice 815.

The process ID 811 is a unique ID in the system for identifying a process being executed.

The type 812 represents a scheduling type of the process. With respect to a standard process of which the type 812 is "standard", a core 311 which is a computation resource is allocated by time-sharing scheduling. A standard process can share a core allocated to the process with other processes and can continue to use the allocated core 311 until either a remaining use time indicated by the time slice 815 elapses or a wait (sleep) occurs due to I/O processing or the like. When a core 311 is allocated to a real-time process of which the type 812 is "real-time", the real-time process can continue running as long as the process itself releases the core 311.

In the present embodiment, processes of the application program 510, the monitoring program 550, and the like are standard processes. A process of the storage program 540 is a real-time process. A process of the storage program 540 may be referred to as a storage process or a storage control process. Moreover, depending on conditions, a storage process may be switched to any one of a real-time process and a standard process. In addition, a real-time process other than a storage process may be executed.

The state 813 represents a state of the process and, in the present embodiment, indicates anyone of "executing", "execution pending", and "I/O pending". The state 813 of "executing" represents a state where the core 311 is allocated to the process and the core 311 is executing the process. The state 813 of "execution pending" represents a state where the process capable of executing processing is waiting for the core 311 to be allocated. The state 813 of "I/O pending" represents a state where the process has been stopped in order to wait for completion of I/O processing.

The core ID 814 represents an ID of the core 311 allocated to the process when the state 813 is "executing" and matches any one of the core IDs 711 shown in the CPU load management table 700.

The time slice 815 represents a remaining use time of the core 311 allocated to a standard process. The time slice 815 is used for processing of the scheduler 530 to be described later. The scheduler 530 reduces the time slice 815 during a period in which a standard process is executing processing (a period in which the state 813 is "executing") and, once the time slice 815 becomes "0", hands over an execution authority of the core 311 to another process. In addition, when allocating the core 311 to a new process or when reallocating the core 311 to a process of which the time slice 815 has become "0", the scheduler 530 configures the time slice 815 of a use time configured in advance.

For example, the entry 821 represents a process of which the process ID 811 is "1000", the type 812 is "standard", the state 813 is "executing", the core ID 814 of the allocated core 311 is "3", and the time slice 815 is "1 ms (millisecond)". In addition, the entry 822 represents a process of which the process ID 811 is "1010", the type 812 is "standard", the state 813 is "I/O pending", the core 311 has not been allocated (the core ID 814 has not been configured "-"), and the time slice 815 is "2 ms". Furthermore, the entry 825 represents a process of which the process ID 811 is "3100", the type 812 is "real-time", the state 813 is "executing", the core ID 814 of the allocated core 311 is "0", and the time slice is not configured "-" since the process is a real-time process.

Moreover, although the two types 812 of "standard" and "real-time" are provided in the present embodiment, the types 812 are not limited thereto. For example, there may be a scheduling type with an extremely low priority to which the core 311 that is a computation resource is not allocated unless there is no other process requesting the core 311.

Figure 9:
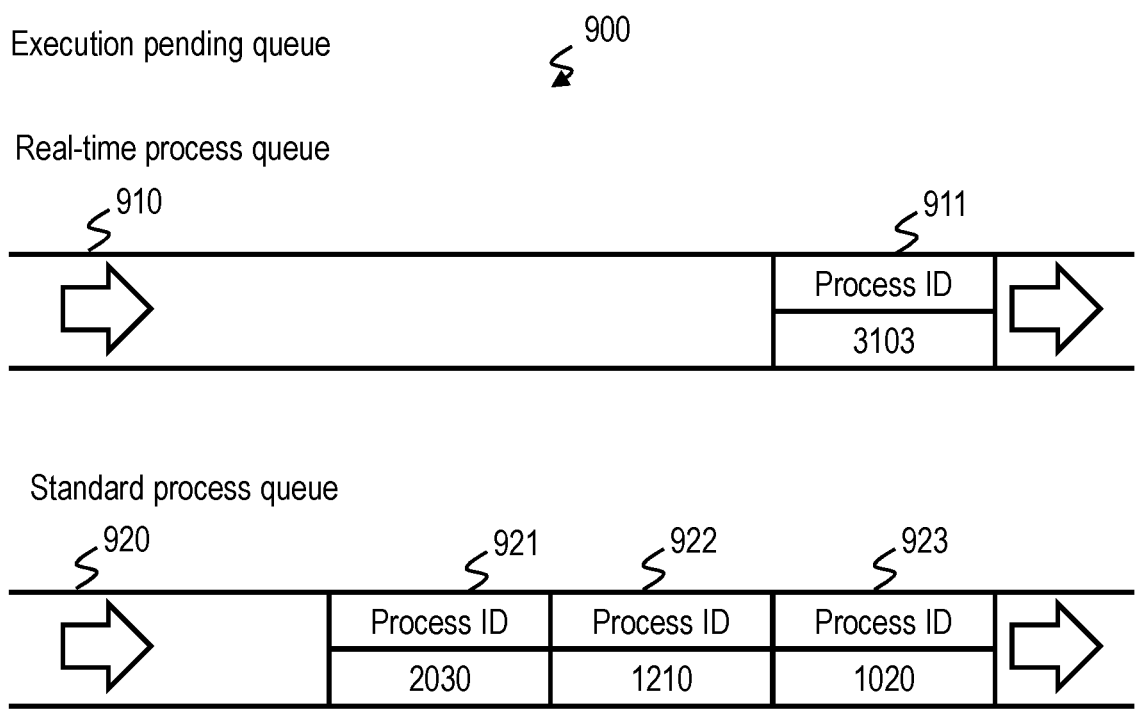
FIG. 9 shows an execution pending queue 900.
Figure 13:
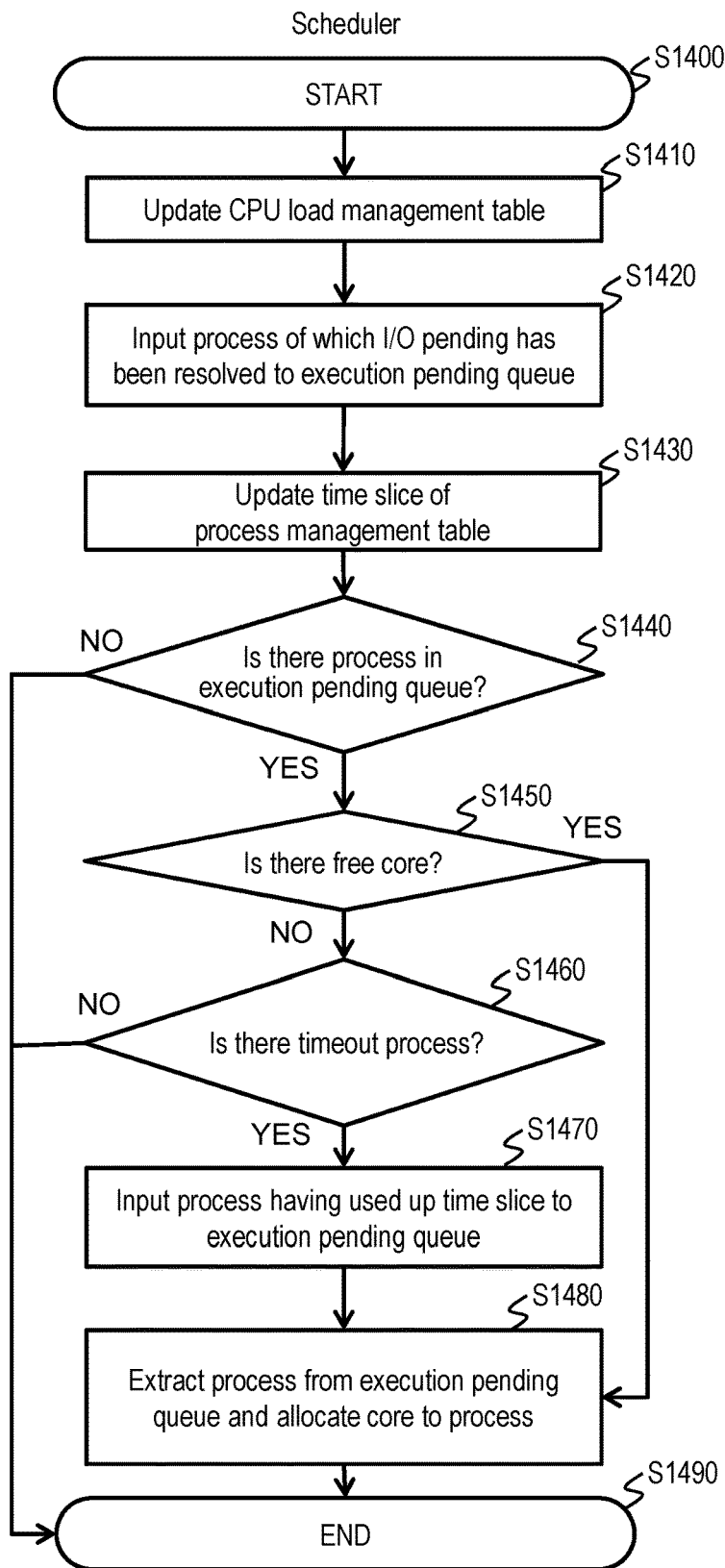
Figure 14:
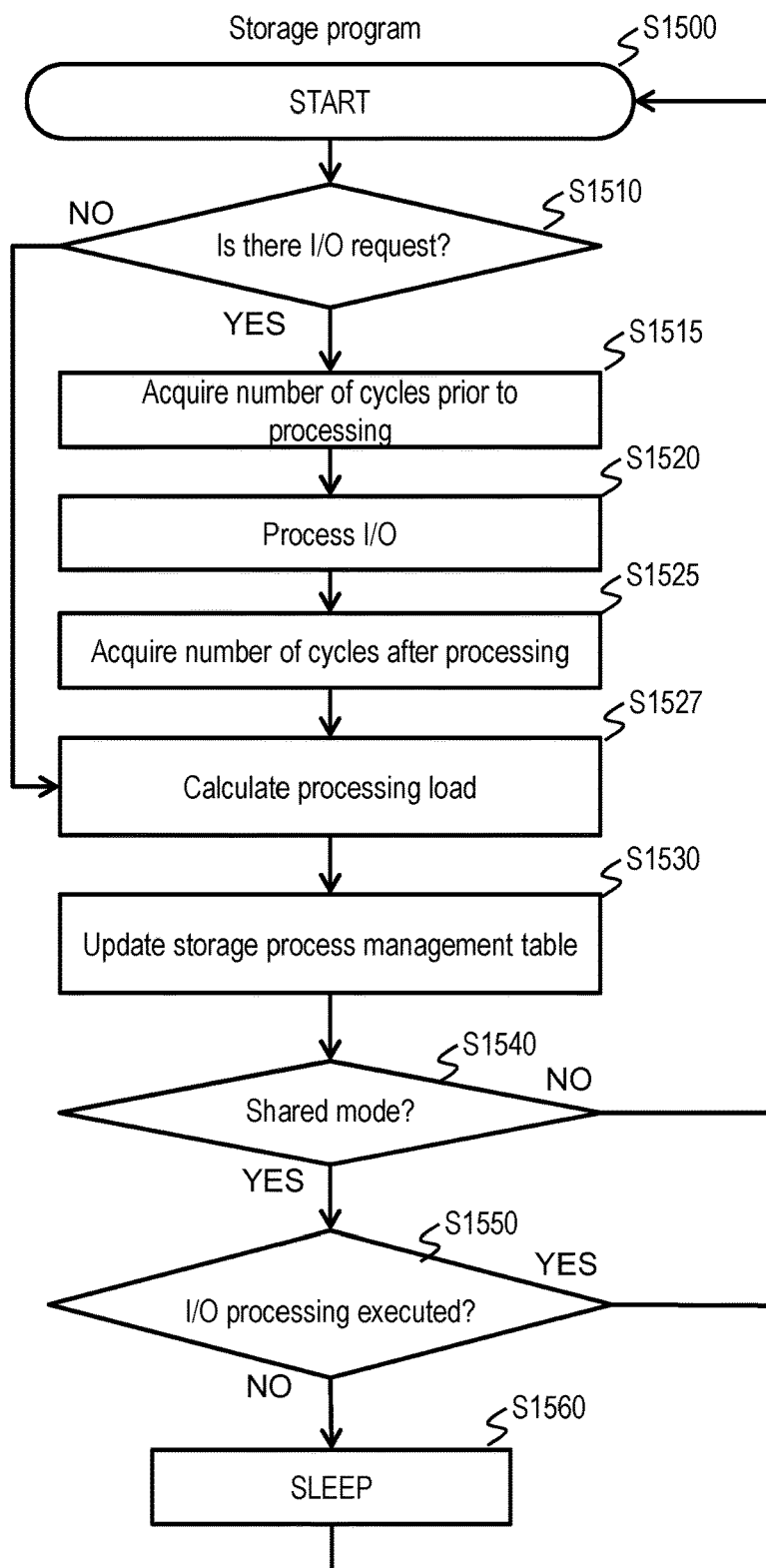
Figure 15:
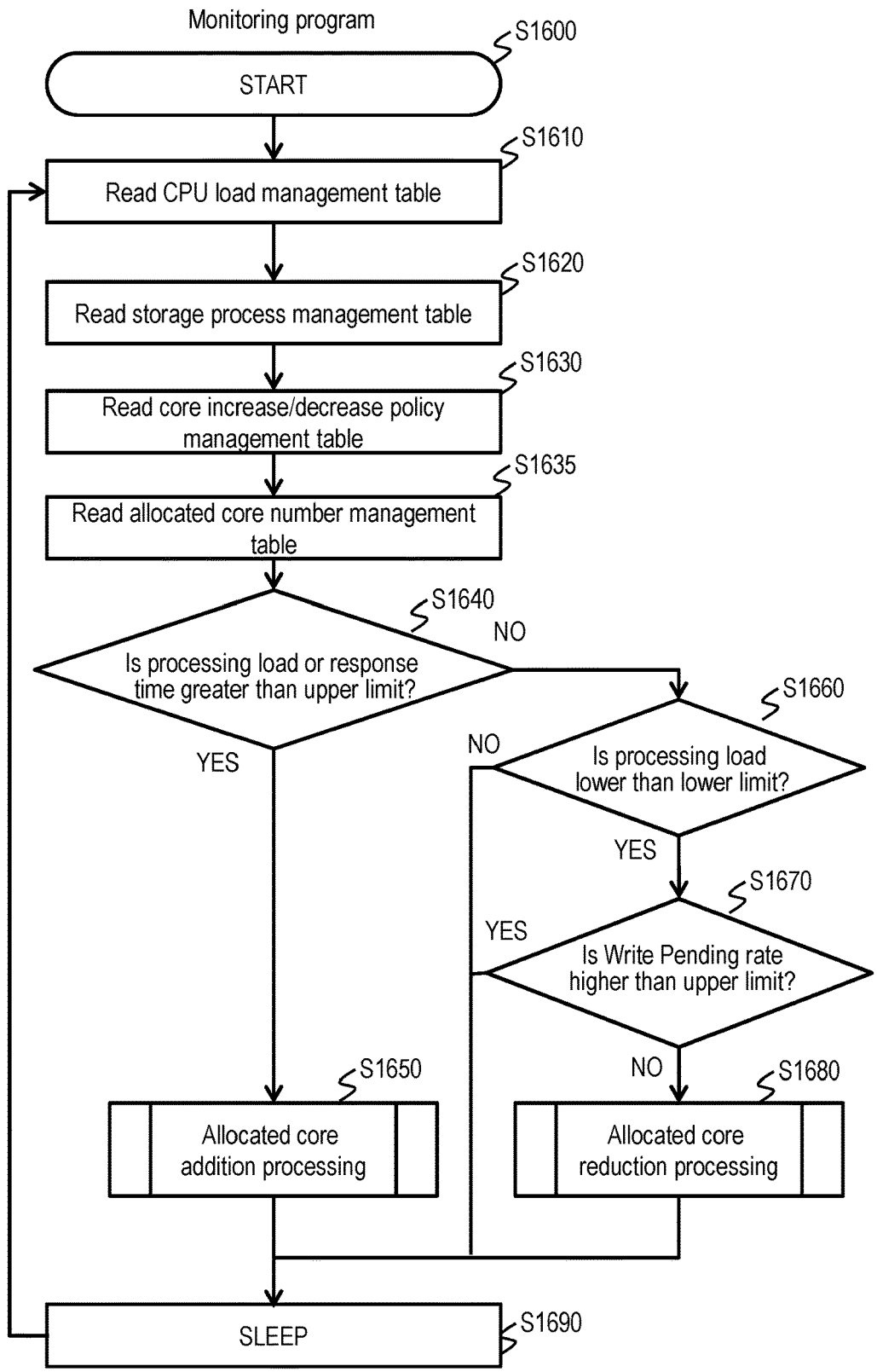
Figure 16:
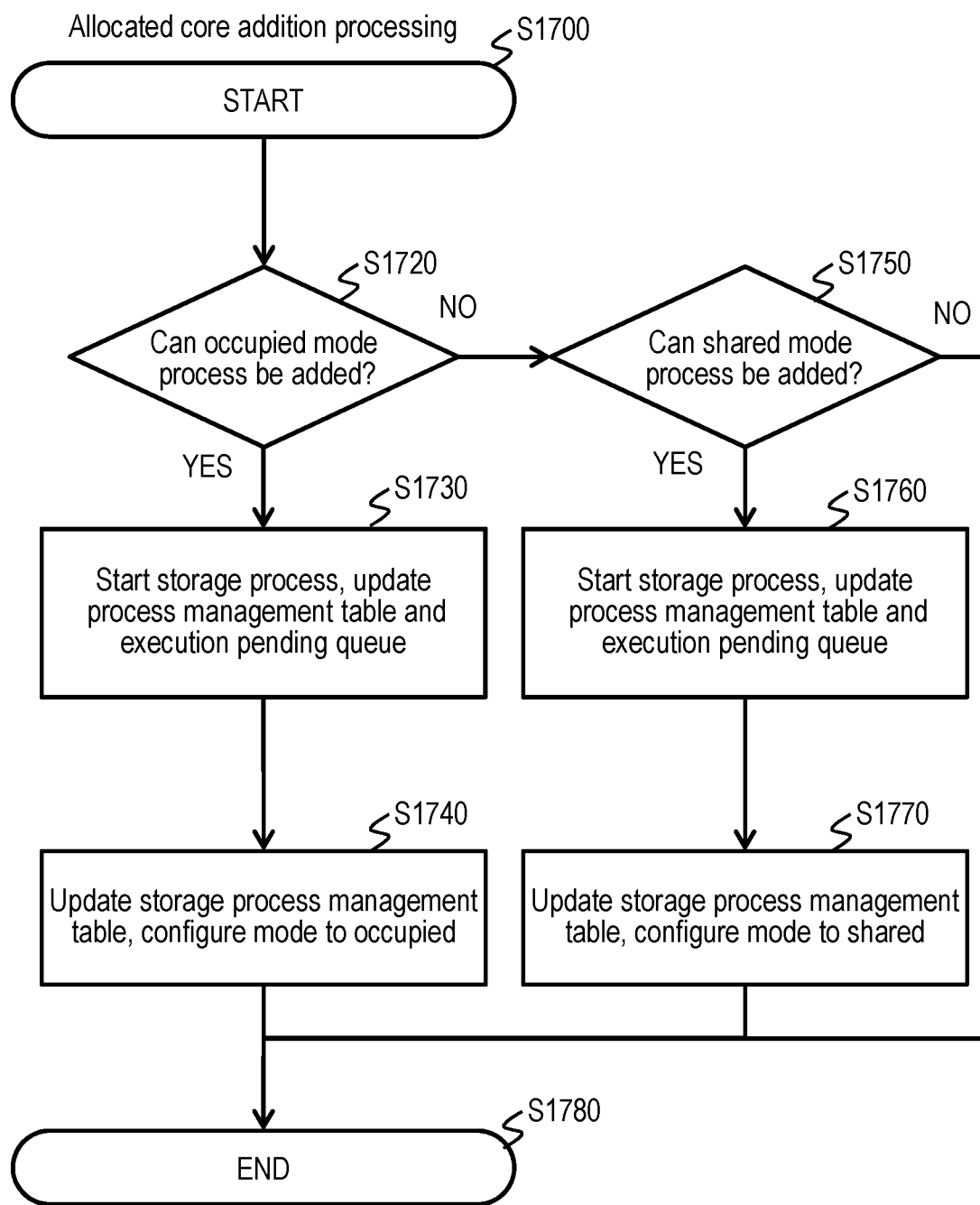
Figure 17:
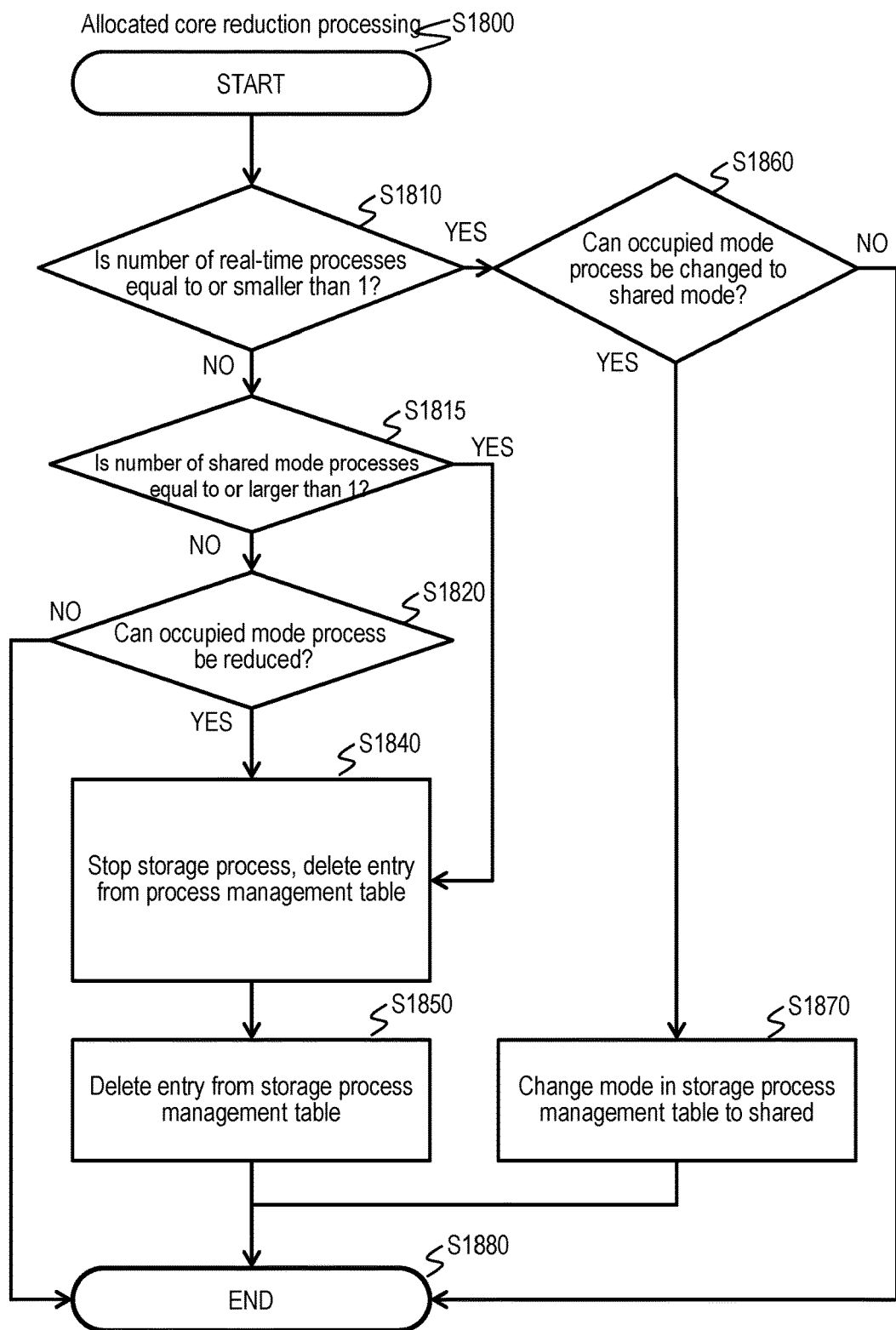

FIG. 9 shows the execution pending queue 900.

The execution pending queue 900 includes, as a FIFO queue for each scheduling type, a real-time process queue 910 and a standard process queue 920. The scheduler 530 and the monitoring program 550 input processes to the execution pending queue 900.

Process IDs 911 of processes to which none of the cores 311 has been allocated and of which the state 813 is "execution pending" among real-time processes are sequentially crammed into the real-time process queue 910. Only "3103" is crammed as the process ID 911 into the real-time process queue 910 in the illustrated example.

Process IDs 911 of processes to which none of the cores 311 has been allocated and of which the state 813 is "execution pending" among standard processes are sequentially crammed into the standard process queue 920. "1020", "1210", and "2030" are crammed in chronological order as process IDs 911 into the standard process queue 920 in the illustrated example.

When the scheduler 530 allocates the core 311 to a process, first, the scheduler 530 refers to the real-time process queue 910 and determines whether or not process IDs are included in the real-time process queue 910. When process IDs are included in the real-time process queue 910, the scheduler 530 allocates the core 311 to a process having a lead process ID in the real-time process queue 910. Conversely, when there are no process IDs in the real-time process queue 910, the scheduler 530 allocates the core 311 to a process having a lead process ID in the standard process queue 920. Details of the processing flow of the scheduler 530 will be provided later.

FIG. 10 shows the storage process management table 1000.

The storage process management table 1000 has an entry for each storage process. The storage process management table 1000 is capable of managing, at a maximum, storage processes up to the number of cores 311 in the server 200. Each entry includes a process ID 1011, a mode 1012, a processing load 1013, a Write Pending rate 1014, and a response time 1015.

The process ID 1011 represents a process ID of a storage process among processes managed by the process management table 800.

The mode 1012 represents anyone of an "occupied" mode and a "shared" mode as a mode of use of the core 311 allocated to a storage process. A process of which the mode 1012 is "occupied" (referred to as an occupied mode process) continues to occupy the allocated core 311 and performs polling regardless of whether or not there is an I/O request from the application program 510 or the client 230. A process of which the mode 1012 is "shared" (referred to as a shared mode process) performs polling as long as there is an I/O request but releases the allocated core 311 when there is no more I/O requests. Accordingly, a standard process such as the application program 510 can effectively utilize the core 311 allocated to a storage process in the shared mode by sharing the core 311 with the storage process in the shared mode.

For example, when there is a small number of I/O requests, a storage process may conserve a computation resource of the server 200 by processing an I/O as a single shared mode process and sharing the core 311 with other programs. In addition, when there is a large number of I/O requests to a storage process, while all of the cores 311 in the server 200 are to execute a storage process, a part of the storage processes may be run as shared mode processes so that the cores 311 may also be allocated to other programs.

The processing load 1013 represents a load actually required by a storage process for I/O processing instead of a load on the core 311 including polling.

The Write Pending rate 1014 represents a proportion of data not written into the disk apparatus 350 among data written into the storage cache 560. In other words, the Write Pending rate 1014 represents a proportion of dirty data to a sum of clean data and dirty data in the storage cache 560. The higher the Write Pending rate, the larger an amount of write processing from the storage cache 560 to the disk apparatus 350. Accordingly, the server 200 can recognize that, the higher the Write Pending rate, the greater the load of a storage process. Moreover, dirty data may also be referred to as write pending data. Alternatively, a write pending data amount representing a size of the write pending data such as a dirty data size may be used in place of the Write Pending rate.

The response time 1015 represents the time required by a process to respond after an I/O request had been issued. Since the response time is a wait time of the application program 510 or the client 230 which is a request source, the server 200 can recognize an impact on the request source by measuring the response time.

A storage process measures and updates the processing load 1013, the Write Pending rate 1014, and the response time 1015 in the storage process management table 1000. Moreover, at least any one of the processing load, the response time, and the write pending data amount may be referred to as I/O information.

FIG. 10 shows storage process management tables 1000A and 1000B as two specific examples of the storage process management table 1000.

The storage process management table 1000A represents an example in which two occupied mode processes are running as storage processes. For example, an entry 1021 represents a process of which the process ID is "3100", the mode 1012 is "occupied", the processing load 1013 is "50%", the Write Pending rate 1014 is "10%", and the response time 1015 is "1 ms".

The storage process management table 1000B represents an example in which a single shared mode process is running as a storage process. For example, an entry 1031 represents a process of which the process ID 1011 is "3100", the mode 1012 is "shared", the processing load 1013 is "10%", the Write Pending rate 1014 "10%", and the response time 1015 is "1 ms".

According to the storage process management table 1000, the monitoring program 550 can use information measured by a process of the storage program 540.

FIG. 11 shows the core increase/decrease policy management table 1100.

The core increase/decrease policy management table 1100 has an entry for each policy item used to determine whether to increase or reduce cores. Each entry includes a policy item 1111, an upper limit 1112, and a lower limit 1113.

The policy item 1111 represents, for example, an "average processing load", an "average Write Pending rate", or an "average response time". An entry 1121 of which the policy item 1111 is "average processing load" includes the upper limit 1112 (an I/O load upper limit value) and the lower limit 1113 (an I/O load lower limit value). An entry 1122 of which the policy item 1111 is "average Write Pending rate" includes the upper limit 1112 (a Write Pending rate upper limit value). An entry 1123 of which the policy item 1111 is "average response time" includes the upper limit 1112 (a response time upper limit value).

For example, as a policy, the entry 1121 indicates that the upper limit 1112 of the "average processing load" is "80%" and that the lower limit 1113 of the "average processing load" is "20%".

The monitoring program 550 determines whether to increase or reduce cores to be allocated by comparing an average value of the processing load 1013, an average value of the Write Pending rate 1014, and an average value of the response time 1015 in the storage process management table 1000 with corresponding policies. Processing by the monitoring program 550 will be described later.

Moreover, while the three policy items 1111 of the "average processing load", the "average Write Pending rate", and the "average response time" have been described in the present embodiment, policy items are not limited thereto. For example, each policy may be a policy for each storage process instead of an average value of a plurality of processes. In addition, an amount of utilization of the storage cache 560 or the like may be used as policy.

FIG. 12 shows the allocated core number management table 1200.

The allocated core number management table 1200 represents a configuration related to an allocation of cores 311 in the server 200. The allocated core number management table 1200 includes a total number of cores 1211, a minimum number of occupied cores 1212, a maximum number of occupied cores 1213, and a maximum number of shared cores 1214.

The total number of cores 1211 represents the number of cores 311 in the server 200.

The minimum number of occupied cores 1212 represents a lower limit value of the number of cores to be allocated to an occupied mode process among the total number of cores 1211. Regardless of a determination based on the core increase/decrease policy management table 1100, the monitoring program 550 does not reduce the number of cores so that the number of cores to be allocated to an occupied mode process becomes smaller than the minimum number of occupied cores 1212.

The maximum number of occupied cores 1213 represents an upper limit value of the number of cores to be allocated to an occupied mode process among the total number of cores 1211. Regardless of a determination based on the core increase/decrease policy management table 1100, the monitoring program 550 does not increase the number of cores so that the number of cores to be allocated to an occupied mode process becomes larger than the maximum number of occupied cores 1213.

The maximum number of shared cores 1214 represents an upper limit value of the number of cores to be allocated to a shared mode process among the total number of cores 1211.

The allocated core number management table 1200 is configured so that a sum of the maximum number of occupied cores 1213 and the maximum number of shared cores 1214 is equal to or less than the total number of cores 1211.

FIG. 12 shows allocated core number management tables 1200A and 1200B as two specific examples of the allocated core number management table 1200.

The allocated core number management table 1200A shows that the total number of cores 1211 is "4", the minimum number of occupied cores 1212 is "1", the maximum number of occupied cores 1213 is "3", and the maximum number of shared cores 1214 is "0". The minimum number of occupied cores 1212 being "1" indicates that one or more occupied mode processes are to run. The maximum number of shared cores 1214 being "0" indicates that no shared mode processes is to run.

In other words, this configuration indicates that, even when the number of I/O requests is small, an occupied mode process inevitably runs while occupying one or more cores 311, and even when the number of I/O requests is large, only three occupied mode processes are to run at a maximum and at least one core 311 is to be reserved for other programs.

The allocated core number management table 1200B shows that the total number of cores 1211 is "4", the minimum number of occupied cores 1212 is "0", the maximum number of occupied cores 1213 is "3", and the maximum number of shared cores 1214 is "1". The minimum number of occupied cores 1212 being "0" indicates that an occupied mode process need not run. The maximum number of shared cores 1214 being "1" indicates that a shared mode process may run.

In other words, this configuration indicates that, when the number of I/O requests is small, only one shared mode process may run as a storage process.

According to the allocated core number management table 1200, the number of cores to be allocated to a storage process can be limited. Moreover, the CPU load management table 700, the process management table 800, and the storage process management table 1000 which represent states of each process and each processor core may be referred to as state information.

Hereinafter, operations of the server 200 will be described.

Hereinafter, an operation of the core 311 in accordance with a single process of a single program will be described using the program as a subject.

When a core allocated to the interrupt processing program 520 receives an I/O interrupt request issued by a device such as the HBA 330, the NIC 340, a disk apparatus, or the like or receives an interrupt request regularly issued by the Clock 360, the interrupt processing program 520 starts interrupt processing.

Next, the interrupt processing program 520 executes unique processing in accordance with the interrupt source (the HBA 330, the NIC 340, a disk apparatus, or the Clock 360). For example, in a case of an interrupt request from the Clock 360, processing for updating a system time point in the server 200 is performed.

Next, the interrupt processing program 520 calls the scheduler 530. Once the processing by the scheduler 530 is completed, the interrupt processing program 520 ends the interrupt processing.

Figure 13:
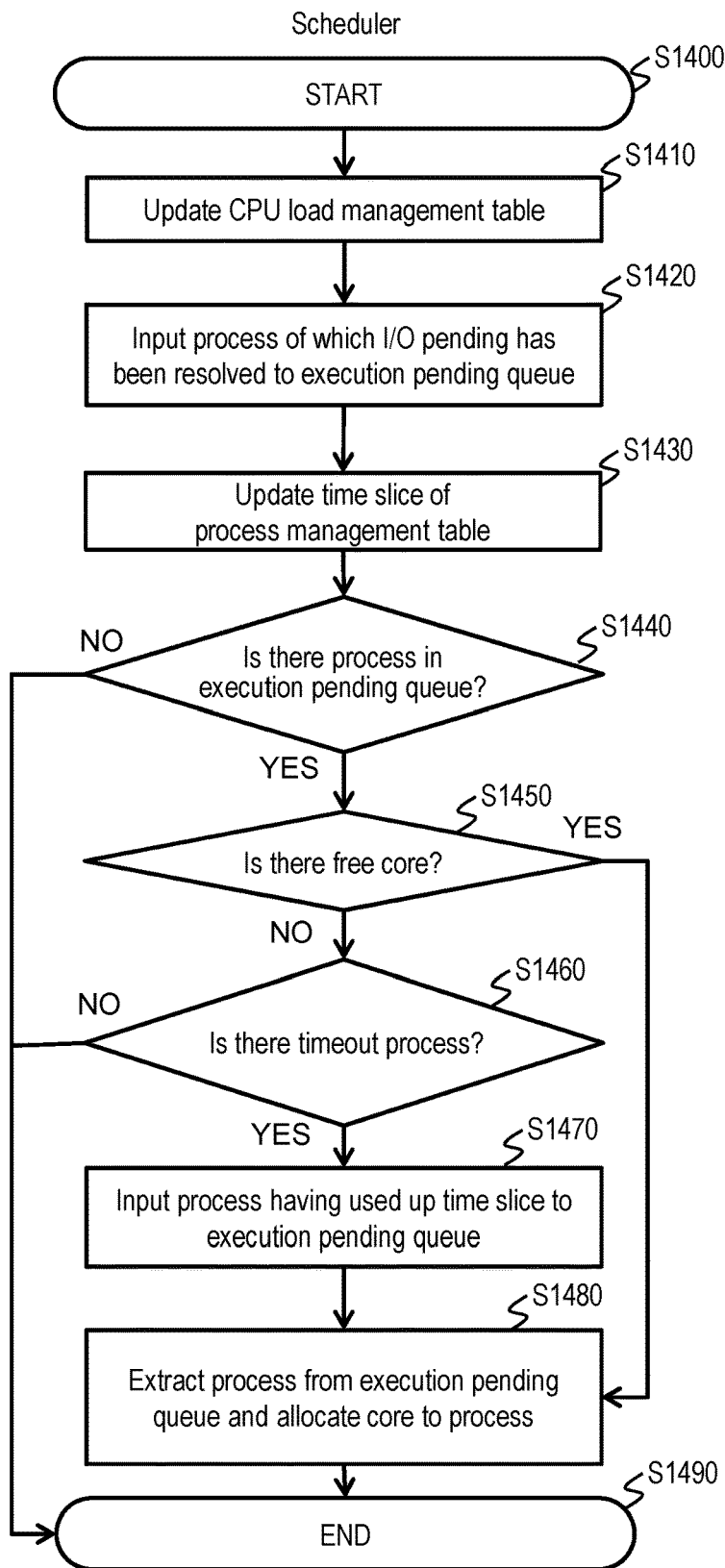
FIG. 13 shows an operation of a scheduler 530.

FIG. 13 shows an operation of the scheduler 530.

The scheduler 530 starts when called by the interrupt processing program 520 (S1400).

Next, the scheduler 530 measures a load on each core 311 based on the number of execution cycles of each core 311, and updates the load 712 in the CPU load management table 700 with the measured load (S1410). For example, the scheduler 530 acquires the number of execution cycles from the core 311 and acquires a system time point. The scheduler 530 further calculates the number of increased cycles by subtracting a previously acquired number of execution cycles from the currently acquired number of execution cycles. The scheduler 530 further calculates an elapsed time by subtracting a previously acquired system time point from the currently acquired system time point, calculates the number of cycles in the elapsed time by multiplying the elapsed time by a CPU clock frequency of the CPU 310, and calculates a core load representing a load on the core 311 by dividing the number of increased cycles by the number of cycles in the elapsed time. When the core 311 continuously runs as during polling, the core load reaches 100%.

Next, the scheduler 530 inputs a process of which I/O pending has been resolved to the execution pending queue 900 (S1420). For example, when the scheduler 530 has been called by an I/O interrupt request issued by an I/O device such as the HBA 330, the NIC 340, and a disk apparatus, in order to restart (awake) a process having been stopped at I/O completion pending of the I/O device, the scheduler 530 detects a process of which the state 813 is "I/O pending" from the process management table 800, changes the state 813 of the process to "execution pending", and inputs the process to the execution pending queue 900 (S1420).

Next, the scheduler 530 changes the time slice 815 of the process in the process management table 800 to a use time configured in advance (S1430).

Next, the scheduler 530 determines whether or not there is a process in the execution pending queue 900 (S1440). In other words, when at least one of the real-time process queue 910 and the standard process queue 920 stores a process waiting for allocation of the core 311, the scheduler 530 determines that there is a process in the execution pending queue 900.

When it is determined in step S1440 that there is a process in the execution pending queue 900 (S1440: YES), the scheduler 530 determines whether or not there is a free core (S1450). For example, the scheduler 530 considers a core not registered in the process management table 800 (a core not allocated to any process, an unallocated core) among the plurality of cores 311 in the server 200 to be a free core.

When it is determined in step S1450 that there is no free core (S1450: NO), the scheduler 530 determines whether or not there is a timeout process (S1460). For example, the scheduler 530 considers a process of which the time slice 815 is 0 (a process having used up the time slice 815) in the process management table 800 to be a timeout process.

When it is determined in step S1460 that there is a timeout process (S1460: YES), the scheduler 530 inputs the timeout process to the execution pending queue 900 (S1470).

After step S1470 or when it is determined in step S1450 that there is a free core (S1450: YES), the scheduler 530 extracts a process from the head of the execution pending queue 900 and allocates the free core to the extracted process (S1480). At this point, the scheduler 530 registers a core ID of the allocated core to an entry of the process in the process management table 800.

When it is determined in step S1440 that there is no process in the execution pending queue 900 (S1440: NO), when it is determined instep S1460 that there is no timeout process (S1460: NO), or after step S1480, the scheduler 530 ends this flow (S1490).

This concludes the description of the operation of the scheduler 530.

Figure 14:
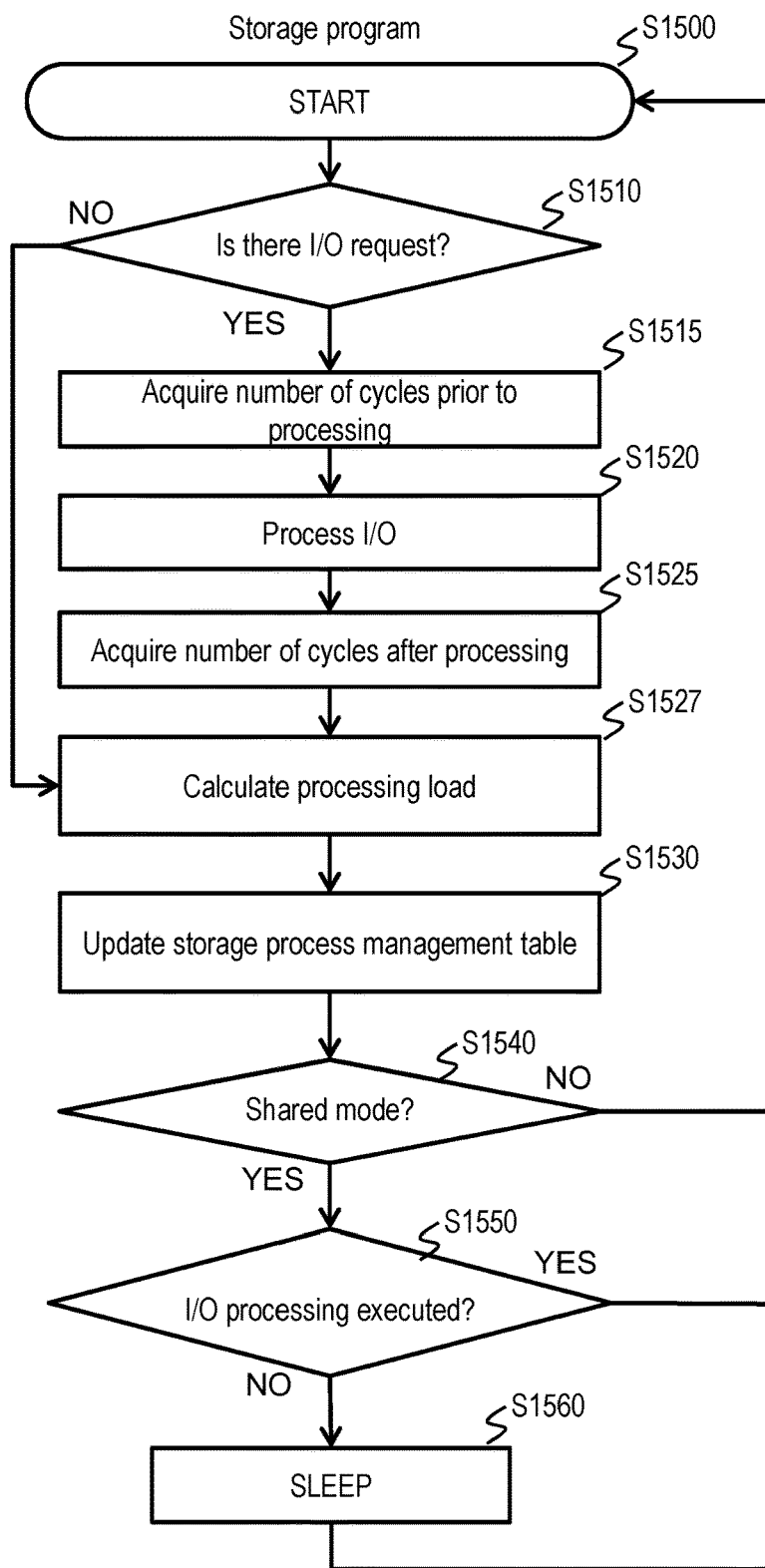
FIG. 14 shows an operation of a storage program 540.

FIG. 14 shows an operation of the storage program 540.

The storage program 540 starts a storage process upon start of the server 200 or when executed from the monitoring program 550 (S1500).

The storage program 540 monitors I/O devices (the HBA 330, the NIC 340, a disk apparatus, and the memory 320) in a non-blocking manner (repetitively without sleeping), and determines whether or not an I/O request has arrived from the application program 510 or the client 230 (S1510). At this point, when issuing an I/O request, an I/O device writes information representing the I/O request into a register in the I/O device or the CPU 310. The storage program 540 determines whether or not an I/O request has arrived by referring to the register.

When it is determined in step S1510 that an I/O request has arrived (S1510: YES), the storage program 540 acquires the number of execution cycles of its own core prior to I/O processing as the number of pre-processing cycles (S1515). The own core refers to a core allocated to the storage program 540.

Next, the storage program 540 acquires an I/O request and executes I/O processing in accordance with the I/O request (S1520).

Next, the storage program 540 acquires the number of execution cycles of its own core after the I/O processing as the number of post-processing cycles, calculates the number of processed cycles by subtracting the number of pre-processing cycles from the number of post-processing cycles, and adds the number of processed cycles to a cumulative number of processed cycles (S1525).

When it is determined in step S1510 that an I/O request has not arrived (S1510: NO) or when step S1525 has been completed, the storage program 540 determines whether or not measurement conditions configured in advance have been satisfied, when the measurement conditions have been satisfied, acquires a system time point as a measurement time point, and calculates a monitoring time by subtracting a previously acquired measurement time point from the currently acquired measurement time point. An example of the measurement conditions is that time equal to or longer than the number of cycles configured in advance has elapsed after acquiring the measurement time point. The storage program 540 further calculates the number of monitored cycles which represents a maximum number of cycles within the monitoring time by multiplying the monitoring time by the CPU clock frequency, calculates a processing load which represents a load solely applied by I/O processing in the core load by dividing the cumulative number of cycles by the number of monitoring time cycles, and initializes the cumulative number of processed cycles to 0 (S1527).

Alternatively, the measurement conditions may be that the number of I/O processing performed after acquiring the measurement time point has reached the number of processing configured in advance. In addition, the storage program 540 may execute a calculation of the processing load and initialization of the cumulative number of processed cycles every time a time interval configured in advance elapses.

Furthermore, the storage program 540 calculates a Write Pending rate based on states of clean data and dirty data in the storage cache 560. In addition, the storage program 540 calculates a response time of the I/O processing by subtracting a system time point prior to the I/O processing from a system time point after the I/O processing.

Next, the storage program 540 records the processing load, the Write Pending rate, and the response time in the storage process management table 1000 (S1530).

Subsequently, the storage program 540 refers to the mode 1012 in the storage process management table 1000 and determines whether or not the mode 1012 of the process is "shared" (S1540).

When it is determined in step S1540 that the mode 1012 of the process is "shared" (S1540: YES), the storage program 540 determines whether or not I/O processing has been executed in step S1520 (S1550).

When it is determined in step S1550 that I/O processing has not been executed (S1550: NO), the storage program 540 performs a sleep which involves stopping the process for a sleep time configured in advance and transferring an execution authority of the core to another process (S1560).

When it is determined in step S1540 that the mode 1012 of the process is not "shared" (S1540: NO), when it is determined in step S1550 that I/O processing has been executed (S1550: YES), or when the sleep in step S1560 has been completed, the storage program 540 returns to step S1500.

According to the flow described above, when the storage process is an occupied mode process, polling is performed in which steps S1510 to S1540 are repeated without releasing the core 311. On the other hand, when the storage process is a shared mode process and when there is no I/O processing, having the storage process sleep in step S1560 enables another process to use the core. Accordingly, the performance of a standard process can be improved. In addition, by measuring the numbers of cycles before and after I/O processing, the server 200 can measure a processing load separate from a load on a core. Furthermore, by having the storage process measure a state of I/O processing such as a processing load, a Write Pending rate, and a response time, the monitoring program 550 can use the state of the I/O processing. Accordingly, the server 200 can recognize an excess or a deficiency of computation resources used by I/O processing and can allocate an appropriate computation resource to each process.

Figure 15:
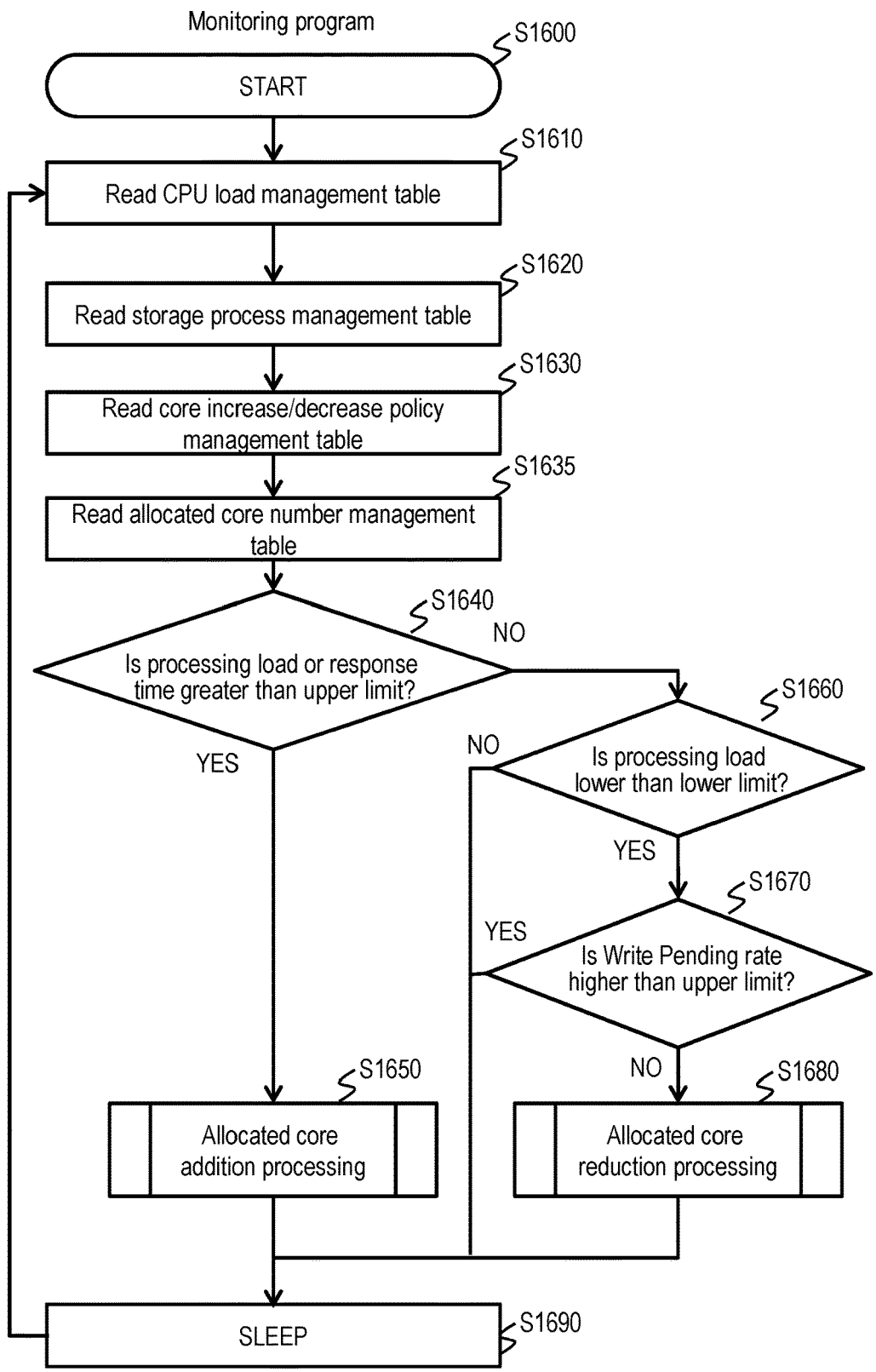
FIG. 15 shows an operation of a monitoring program 550.

FIG. 15 shows an operation of the monitoring program 550.

The monitoring program 550 starts a standard process of the monitoring program 550 upon start of the server 200 (S1600).

Next, the monitoring program 550 reads the CPU load management table 700 (S1610). Next, the monitoring program 550 reads the storage process management table 1000 (S1620). Next, the monitoring program 550 reads the core increase/decrease policy management table 1100 (S1630). Next, the monitoring program 550 reads the allocated core number management table 1200 (S1635).

Next, based on the storage process management table 1000, the monitoring program 550 calculates an average processing load and an average response time and determines whether or not at least one of the average processing load and the average response time is greater than a corresponding upper limit (S1640). In this case, the monitoring program 550 calculates an average value of processing loads of all entries of the storage process management table 1000 as the average processing load and calculates an average value of response times of all entries of the storage process management table 1000 as the average response time. In addition, the monitoring program 550 refers to the upper limit 1112 "80%" of the entry 1121 of the average processing load in the core increase/decrease policy management table 1100 and determines whether or not the average processing load is higher than "80%". The monitoring program 550 further refers to the upper limit 1112 "5 ms (milliseconds)" of the entry 1123 of the average response time in the core increase/decrease policy management table 1100 and determines whether or not the average response time is longer than "5 ms".

When it is determined in step S1640 that at least one of the average processing load and the average response time is greater than the upper limit (S1640: YES), the monitoring program 550 calls allocated core addition processing for increasing the number of cores allocated to the storage process (S1650). The allocated core addition processing will be described later.

Moreover, the allocated core addition processing may be referred to as an addition determination. At least any one of the average processing load and the average response time being greater than the upper limit may be referred to as an addition determination condition.

When it is determined in step S1640 that neither the average processing load nor the average response time is greater than the upper limit (S1640: NO), the monitoring program 550 determines whether or not the average processing load is lower than a corresponding lower limit based on the storage process management table 1000 (S1660). In this case, the monitoring program 550 refers to the lower limit 1113 "20%" of the entry 1121 of the average processing load in the core increase/decrease policy management table 1100 and determines whether or not the average processing load is lower than "20%".

When it is determined in step S1660 that the average processing load is lower than the lower limit (S1660: YES), the monitoring program 550 calculates an average Write Pending rate based on the storage process management table 1000 and determines whether or not the average Write Pending rate is higher than an upper limit (S1670). In this case, the monitoring program 550 calculates an average value of Write Pending rates of all entries of the storage process management table 1000 as the average Write Pending rate. At this point, the monitoring program 550 refers to the upper limit 1112 "70%" of the entry 1122 of the average Write Pending rate in the core increase/decrease policy management table 1100 and determines whether or not the average Write Pending rate is higher than "70%".

When it is determined in step S1670 that the average Write Pending rate is not higher than the upper limit (S1670: NO), the monitoring program 550 calls allocated core reduction processing for reducing the number of cores allocated to the storage process (S1680). The allocated core reduction processing will be described later.

Moreover, the allocated core reduction processing may be referred to as a reduction determination. The processing load being lower than the lower limit and the Write Pending rate being equal to or lower than the upper limit may be referred to as a reduction determination condition.

When it is determined in step S1660 that the average processing load is not lower than the lower limit (S1660: NO), when it is determined in step S1670 that the average Write Pending rate is higher than the upper limit (S1670: YES), when the allocated core addition processing in step S1650 has been completed, or when the allocated core reduction processing in step S1680 has been completed, the monitoring program 550 sleeps (S1690).

A period of sleep performed in step S1690 is, for example, but not limited to, 10 seconds. For example, the period of sleep may be 1 second or 1 minute. Alternatively, the sleep period may be variable such as providing a long sleep period immediately after the number of allocated cores changes due to the execution of allocated core addition processing or allocated core reduction processing in order to allow the processing load 1013 and the response time 1015 to stabilize since the change in the number of allocated cores causes an abrupt change in the processing load 1013 and the response time 1015.

Next, after completion of the sleep in step S1690, the monitoring program 550 returns to step S1610 and repetitively executes processing from step S1610.

According to the operation of the monitoring program 550 described above, by executing allocated core addition processing when I/O information satisfies an addition determination condition and executing allocated core reduction processing when the I/O information satisfies a reduction determination condition, even when a core load is constantly close to 100%, the number of cores allocated to a storage process can be changed to an appropriate number. In addition, when the processing load is higher than an upper limit or when the response time is longer than an upper limit, I/O performance can be improved by increasing the cores allocated to the storage process. Furthermore, when the processing load is lower than a lower limit and the Write Pending rate is equal to or lower than an upper limit, by reducing the cores allocated to the storage process, performance of processes other than the storage process can be improved while maintaining I/O performance.

Figure 16:
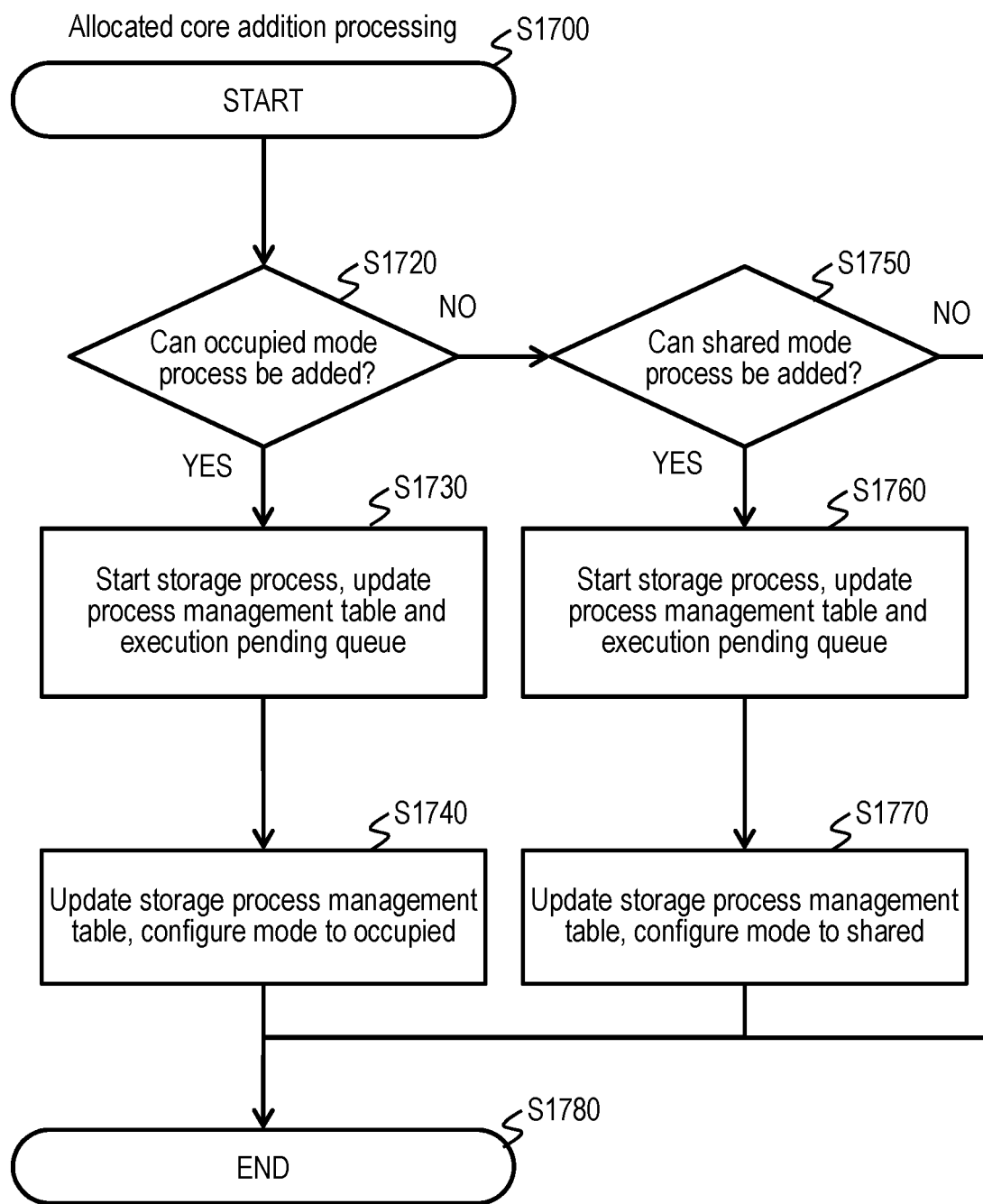
FIG. 16 shows allocated core addition processing.

FIG. 16 shows the allocated core addition processing.

The monitoring program 550 starts the allocated core addition processing according to step S1650 described above (S1700).

The monitoring program 550 determines that an occupied mode process of the storage program 540 can be added when both condition A and condition B presented below are satisfied (S1720).

Condition A is that a load of a standard process can be covered even when the number of cores 311 usable by the standard process is reduced.

For example, in the example of the process management table 800 described earlier, the core #0 and the core #1 are already occupied by a real-time process that is a storage process. In consideration thereof, the monitoring program 550 selects a core 311 not allocated to a real-time process in the process management table 800 and refers to a load of the selected core in the CPU load management table 700. In the example of the CPU load management table 700 described above, when it is assumed that a total load of the load 712 "15%" of the core #2 and the load 712 "10%" of the core #3 is around 25%, the core #3 is to be newly occupied by the storage process, and a load upper limit value is 100%, a load of the core #2 to be allocated to a subsequent standard process can be expected to become equal to lower than the load upper limit value. Moreover, the load upper limit value may be lower than 100%. In this case, the monitoring program 550 determines that, even when the number of cores allocated to the standard process is reduced, the remaining cores can cover the load of the standard process.

Condition B is that the number of occupied mode processes in the storage process management table 1000 is smaller than the maximum number of occupied cores 1213 in the allocated core number management table 1200.

In other words, a condition which enables an occupied mode process to be added (an occupied mode addition condition) is that two or more cores are allocated to a plurality of standard processes, a load of cores after reducing the number of cores allocated to the plurality of standard processes is equal to or lower than a load upper limit value, and the number of occupied mode processes is smaller than the maximum number of occupied cores.

When it is determined in step S1720 that an occupied mode process can be added (S1720: YES), the monitoring program 550 newly starts a storage process (S1730). In this case, starting a storage process refers to the monitoring program 550 loading the storage program 540 to the memory 320, adding an entry of a started process to the process management table 800, registering an ID (a unique number in the server 200) of the process in the process ID 811 of the entry, registering "real-time" in the type 812 of the entry, registering "execution pending" in the state 813 of the entry, and registering (enqueuing) the process ID in the real-time process queue 910.

Next, as an entry of the process started in step S1730, the monitoring program 550 registers the ID of the process in the process ID 1011 and registers "occupied" in the mode 1012 in the storage process management table 1000 (S1740).

When it is determined in step S1720 that an occupied mode process cannot be added (S1720: NO), the monitoring program 550 determines whether or not a shared mode process can be added (S1750). In this case, when the number of processes of which the mode 1012 is "shared" in the storage process management table 1000 is smaller than the maximum number of shared cores 1214 in the allocated core number management table 1200, the monitoring program 550 determines that a shared mode process can be added.

In other words, a condition which enables a shared mode process to be added (a shared mode addition condition) is that a state of the cores does not satisfy the occupied mode addition condition and that the number of shared mode processes is smaller than the maximum number of shared cores.

When it is determined in step S1750 that a shared mode process can be added (S1750: YES), the monitoring program 550 newly starts a storage process (S1760). In this case, starting a storage process refers to adding a line to the process management table 800, storing a unique number in the server 200 (a process ID) in the process ID 811 of the line, entering "real-time" in the type 812 of the line, entering "execution pending" in the state 813 of the line, and registering a same number as the process ID 811 in the real-time process queue 910.

Next, the monitoring program 550 stores the process ID 1011 and the mode 1012 of "shared" as information on the process started in step S1760 in an empty entry of the storage process management table 1000 (S1770).

When an update of the storage process management table 1000 is completed in step S1740 or step S1770, the monitoring program 550 ends the allocated core addition processing (S1780).

Once the allocated core addition processing described above is completed, the monitoring program 550 returns processing to step S1650 of a call source.

According to the allocated core addition processing, by starting a storage process in the occupied mode or the shared mode based on a state of each process and each core, the server 200 can distribute a load of a storage process and improve I/O performance. By having the monitoring program 550 first determine whether or not an occupied mode process can be added, I/O performance of the server 200 can be preferentially improved. Alternatively, the monitoring program 550 may determine whether or not an occupied mode process can be added after determining whether or not a shared mode process can be added. In addition, using an occupied mode addition condition enables the server 200 to add a storage process in the occupied mode within a range equal to or less than the maximum number of occupied cores while maintaining performance of a standard process. Furthermore, using a shared mode addition condition enables the server 200 to add a storage process in the shared mode within a range equal to or less than the maximum number of shared cores while maintaining performance of a standard process.

Figure 17:
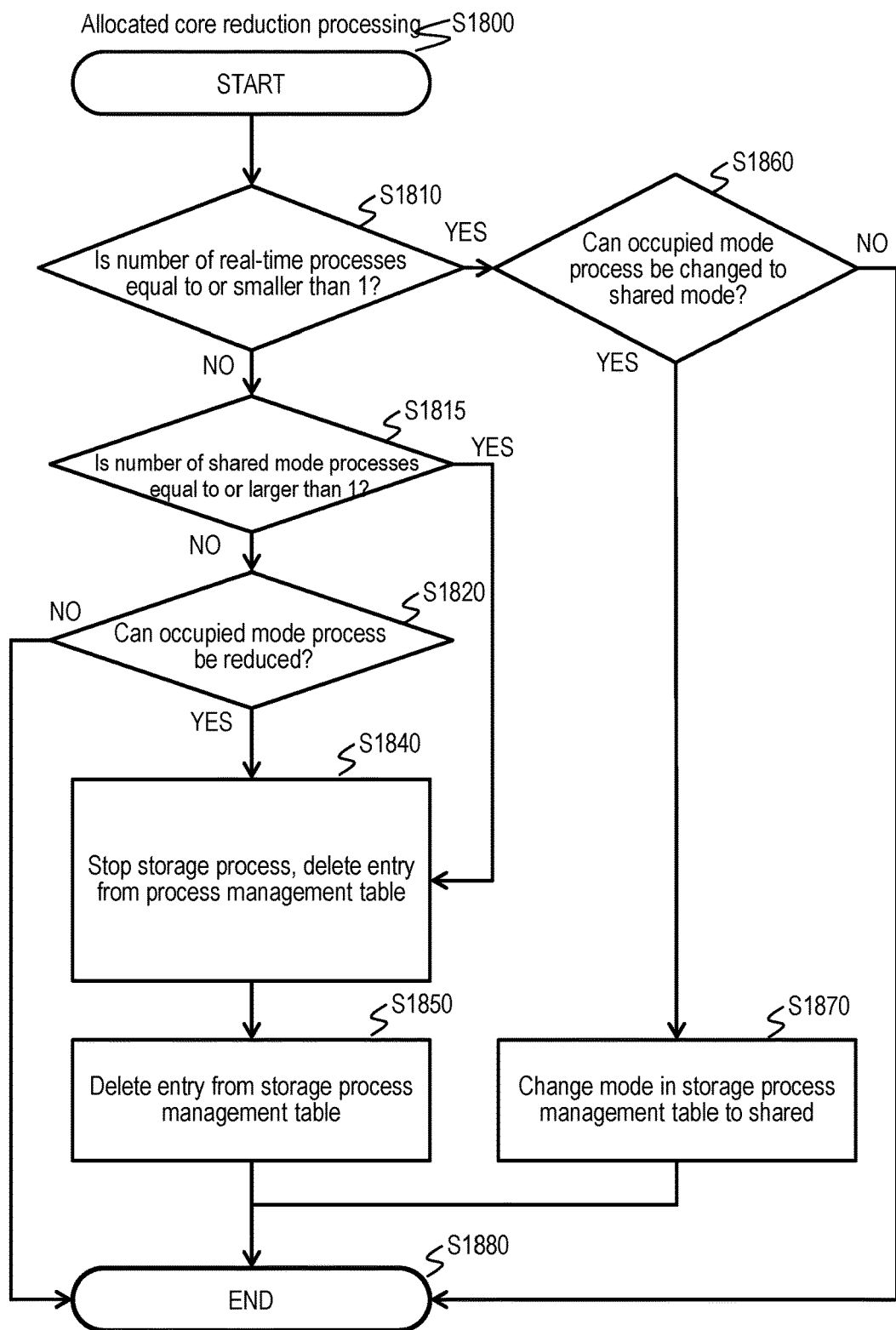
FIG. 17 shows allocated core reduction processing.
Figure 1:
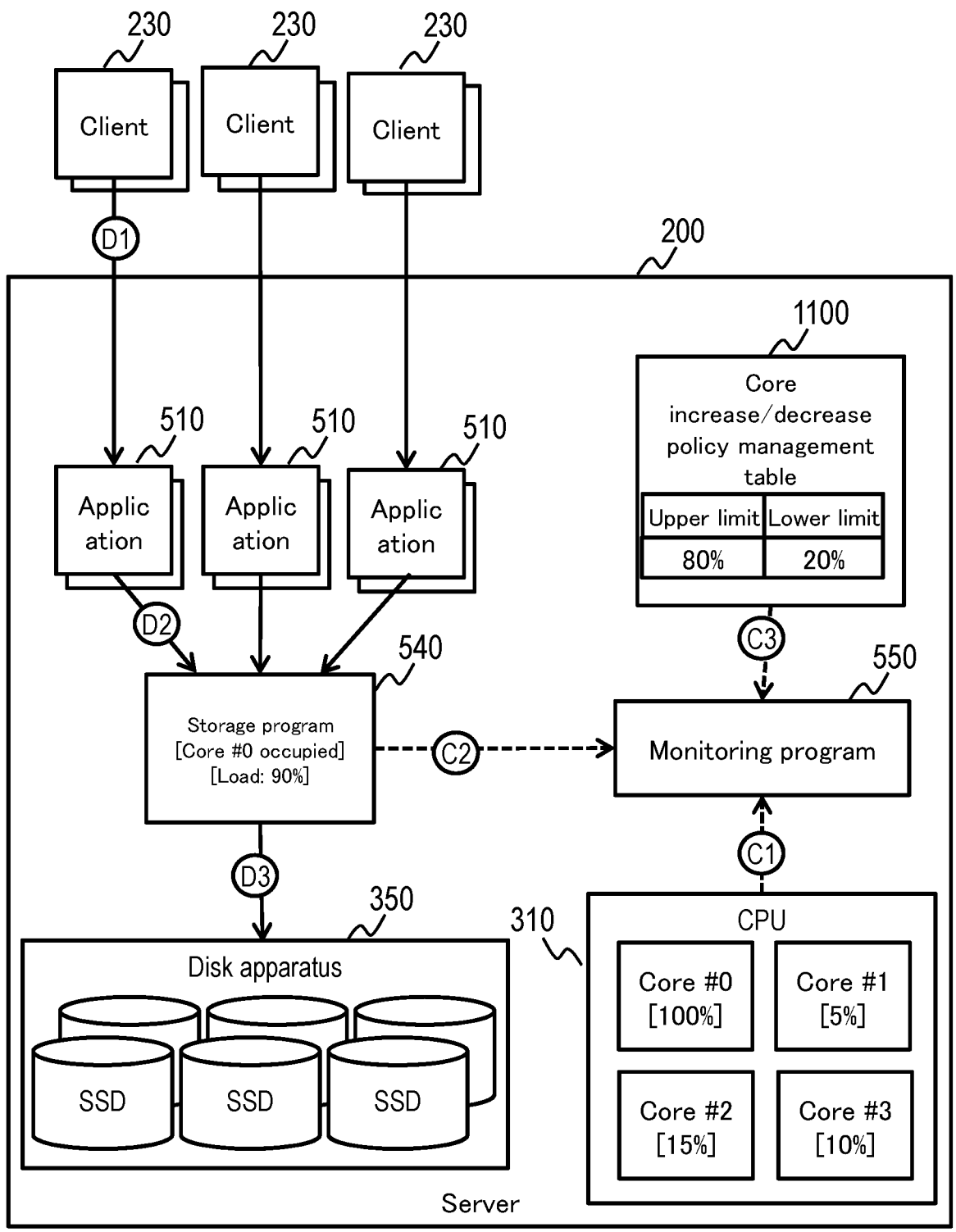
Figure 2:
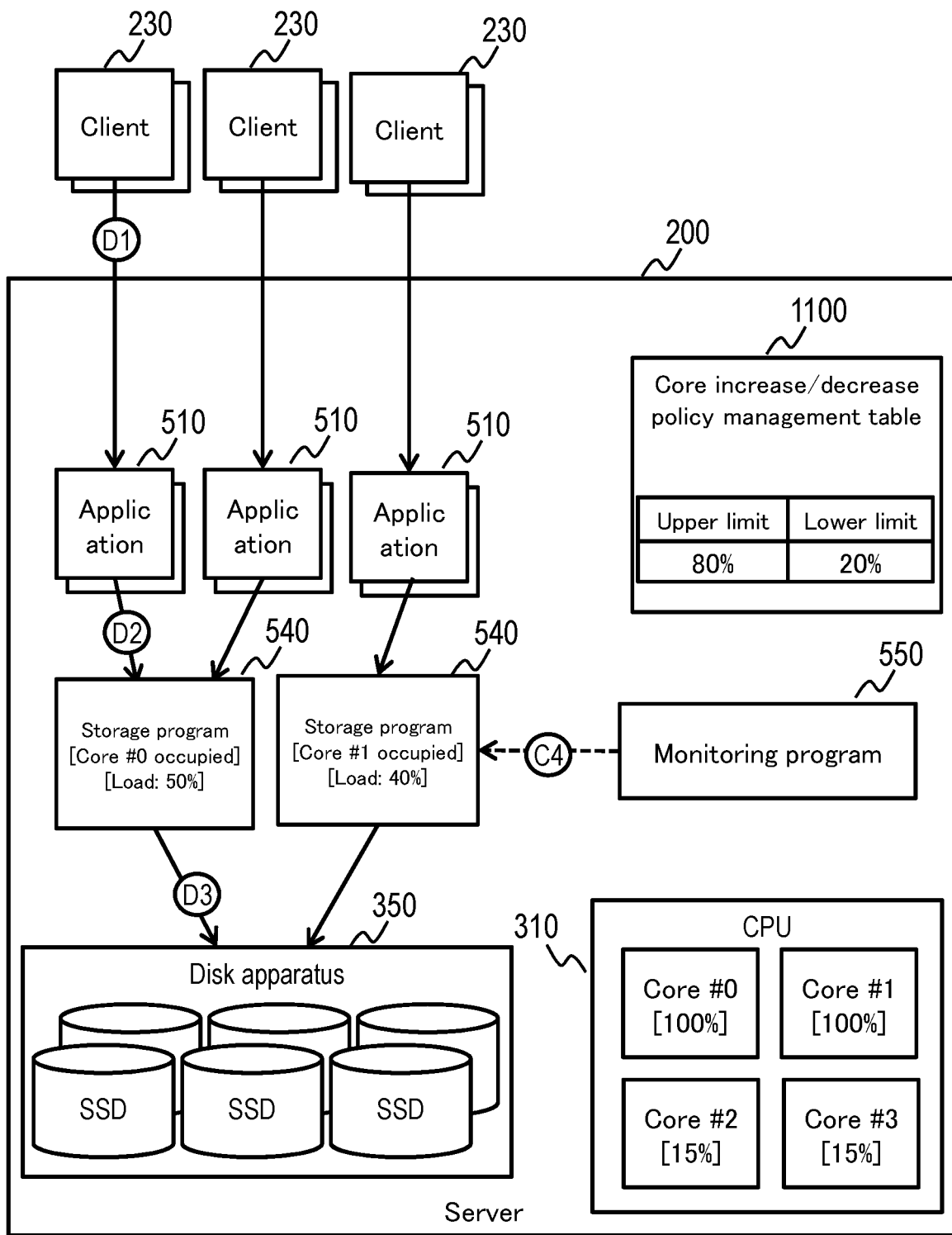
Figure 3:
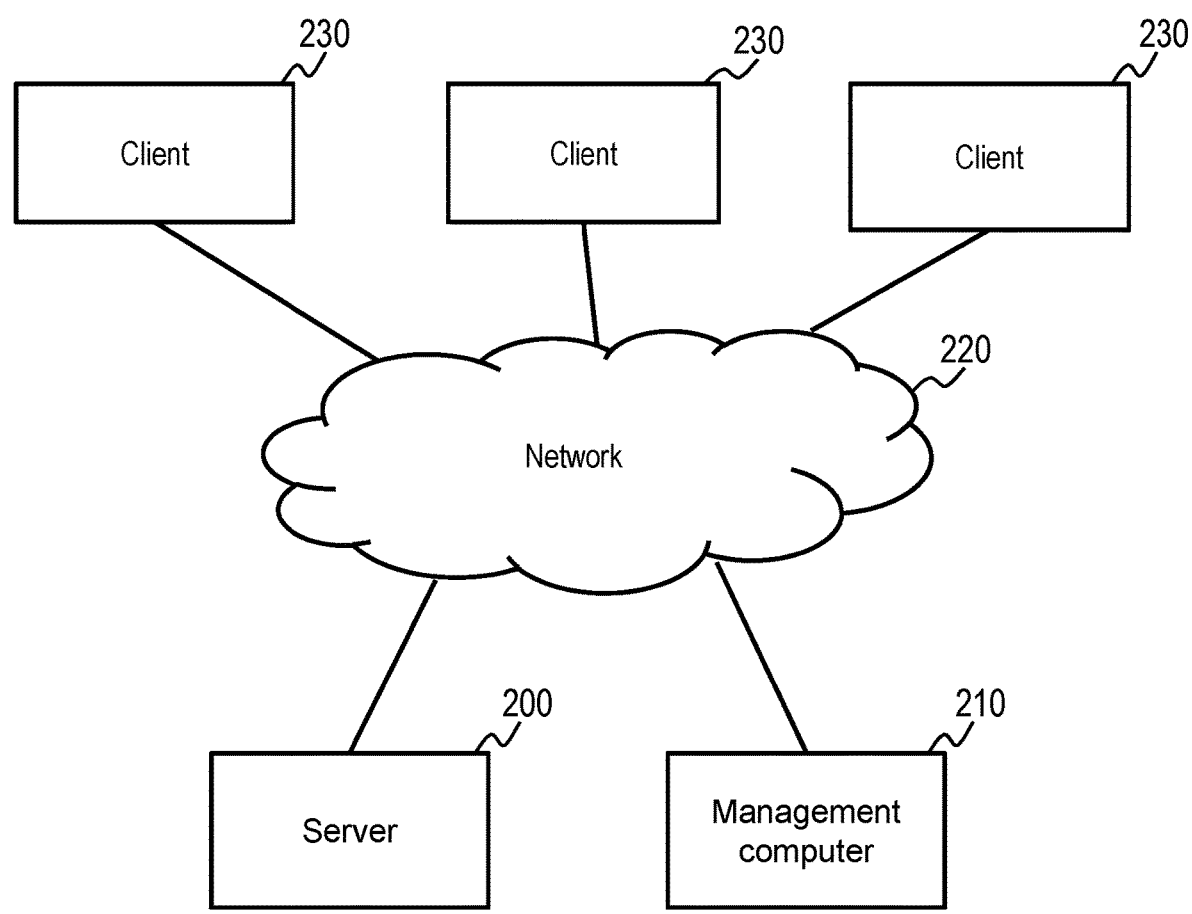
Figure 4:
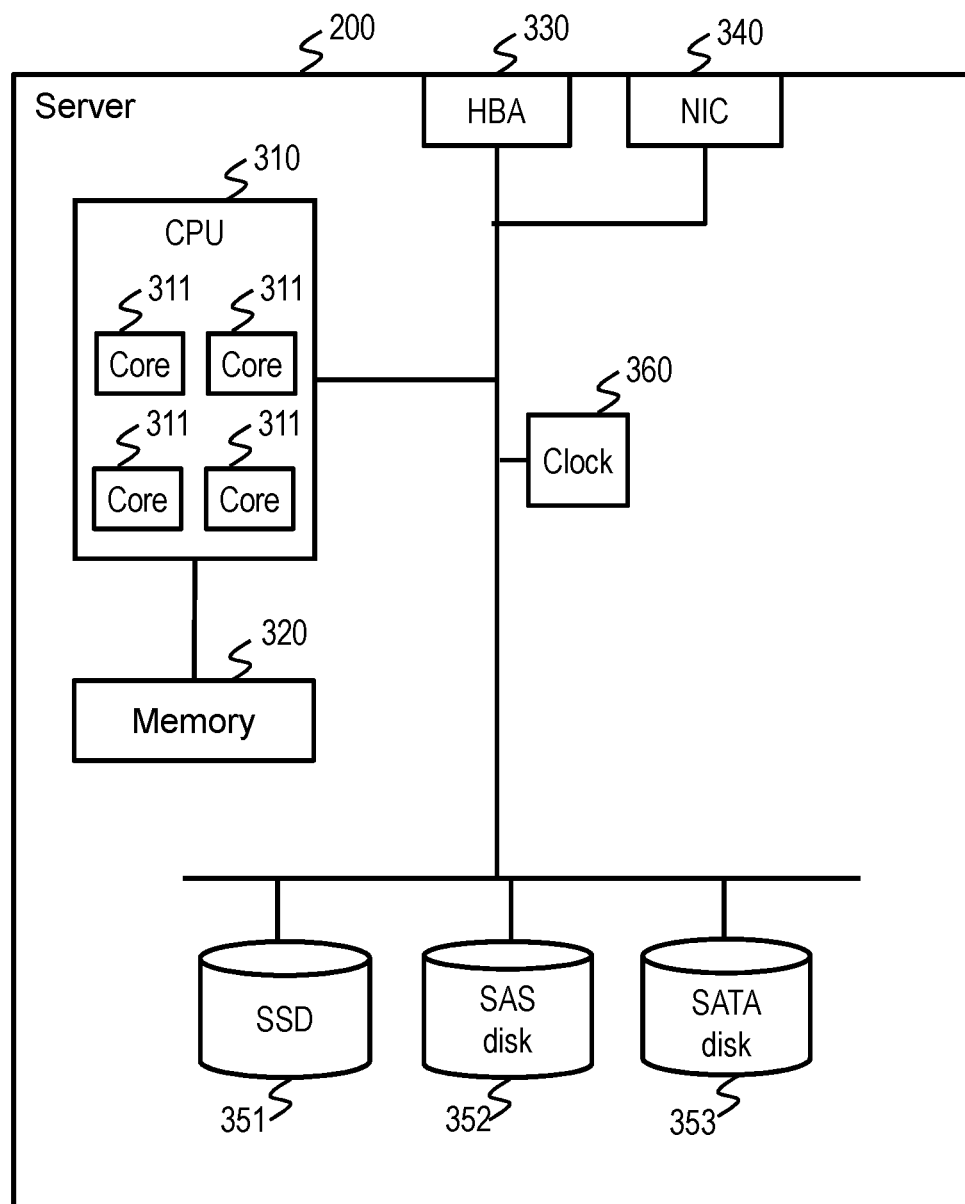
Figure 5:
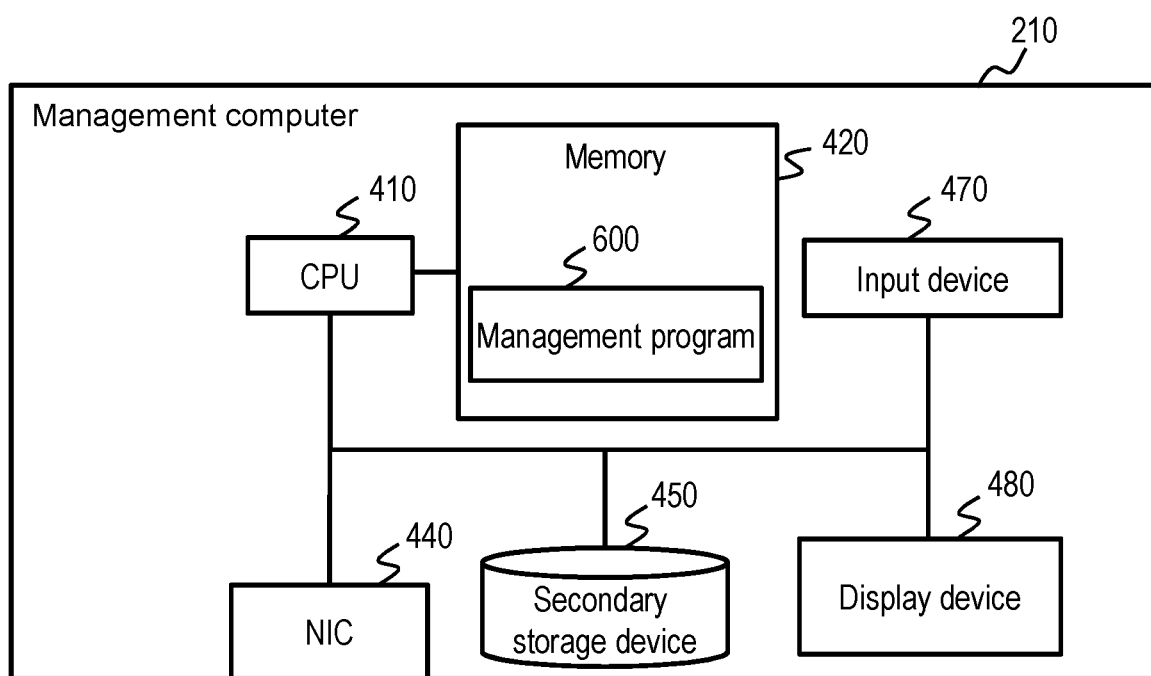
Figure 6:
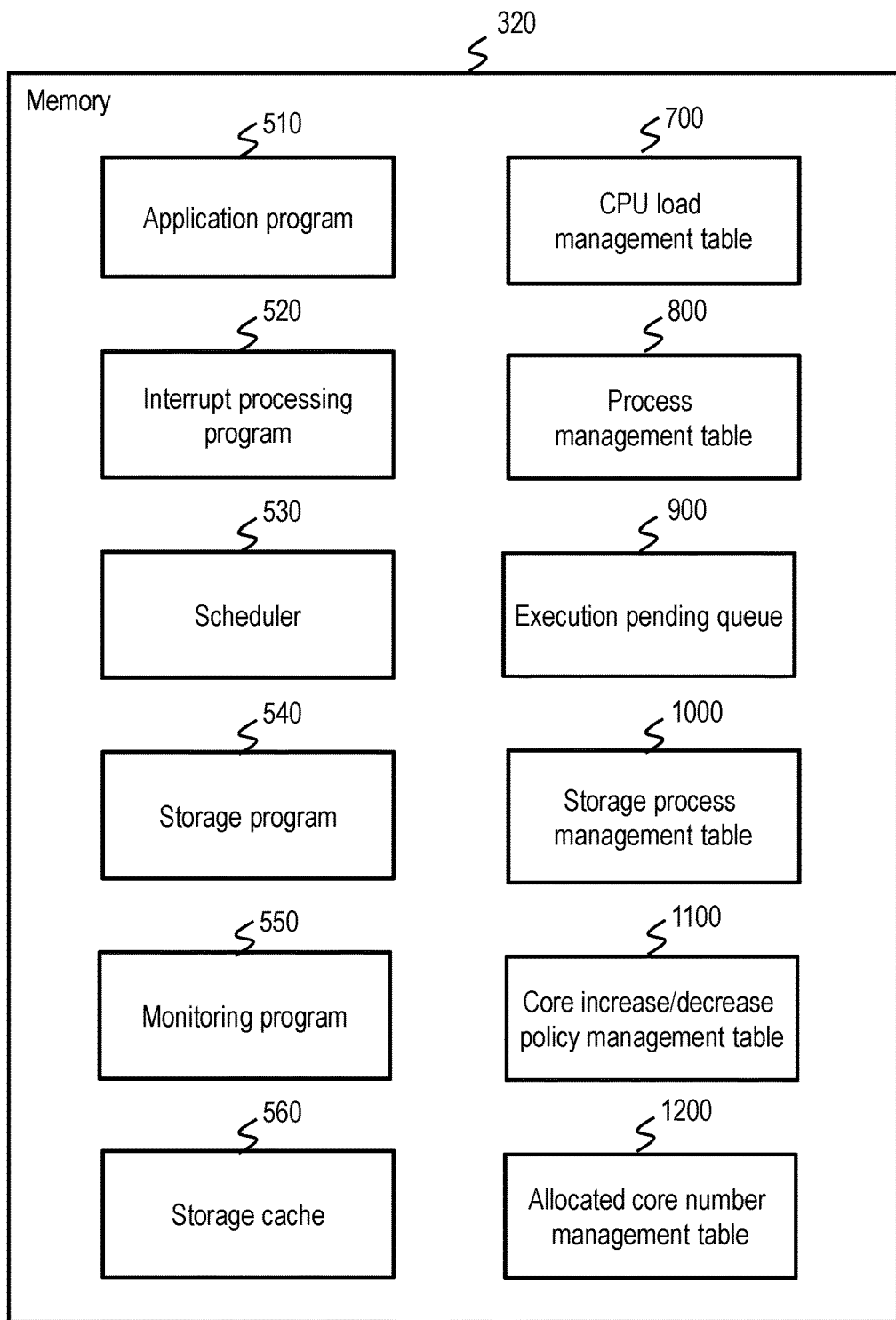

FIG. 17 shows the allocated core reduction processing.

The monitoring program 550 starts the allocated core reduction processing according to step S1680 described above (S1800).

The monitoring program 550 refers to the storage process management table 1000 and determines whether or not the number of real-time processes which is a sum of the number of occupied mode processes and the number of shared mode processes is equal to or smaller than 1 (S1810).

When it is determined in step S1810 that the number of real-time processes is larger than 1 (S1810: NO), the monitoring program 550 checks whether or not the number of shared mode processes is equal to or larger than 1 and determines whether or not a shared mode process can be reduced (S1815). In this case, when the number of shared mode processes is equal to or larger than 1, the monitoring program 550 determines that a shared mode process can be reduced. In other words, a condition which enables a shared mode process to be reduced (a shared mode reduction condition) is that the number of real-time processes is equal to or larger than 2 and that the number of shared mode processes is equal to or larger than 1.

When it is determined in step S1815 that the number of shared mode processes is smaller than 1 (S1815: NO), the monitoring program 550 determines whether or not an occupied mode process can be reduced (S1820). In this case, when the number of occupied mode processes is larger than the minimum number of occupied cores 1212 in the allocated core number management table 1200, the monitoring program 550 determines that an occupied mode process can be reduced. In other words, a condition which enables an occupied mode process to be reduced (an occupied mode reduction condition) is that the number of real-time processes is equal to or larger than 2, the number of shared mode processes is 0, and the number of occupied mode processes is larger than the minimum number of occupied cores.

When it is determined in step S1815 that the number of shared mode processes is equal to or larger than 1 (S1815: YES), the monitoring program 550 refers to the storage process management table 1000 and stops a shared mode process of which the processing load 1013 is lowest. Alternatively, when it is determined instep S1820 that the number of occupied mode processes can be reduced, the monitoring program 550 refers to the storage process management table 1000, selects an occupied mode process of which the processing load 1013 is lowest, and stops the selected occupied mode process (S1840). In this case, stopping a process refers to deleting an entry corresponding to the target process from the process management table 800.

Next, the monitoring program 550 deletes an entry corresponding to the stopped process from the storage process management table 1000 (S1850).

When it is determined in step S1810 that the number of real-time processes is equal to or smaller than 1 (S1810: YES), the monitoring program 550 determines whether or not an occupied mode process can be changed to a shared mode process (S1860). In this case, when the number of occupied mode processes is 1 and the maximum number of shared cores 1214 in the allocated core number management table 1200 is equal to or larger than 1, the monitoring program 550 determines that an occupied mode process can be changed to a shared mode process. In other words, a condition which enables an occupied mode process to be changed to a shared mode process (an occupied mode change condition) is that the number of occupied mode processes is 1 and that the maximum number of shared cores is equal to or larger than 1.

When it is determined in step S1860 that an occupied mode process can be changed to a shared mode process (S1860: YES), the monitoring program 550 selects an occupied mode process of which the processing load 1013 is lowest from the storage process management table 1000, and changes the selected occupied mode process to a shared mode process. Specifically, the mode 1012 of the process in the storage process management table 1000 is changed from "occupied" to "shared".

When it is determined in step S1820 that an occupied mode process cannot be reduced (S1820: NO), when it is determined in step S1860 that an occupied mode process cannot be changed to a shared mode process (S1860: NO), or when an update of the storage process management table 1000 is completed in step S1850 or step S1870, the monitoring program 550 ends the allocated core reduction processing (S1880).

Once the allocated core reduction processing described above is completed, the monitoring program 550 returns processing to step S1680 of a call source.

According to the allocated core reduction processing, by stopping a storage process in the occupied mode or the shared mode based on a state of each process and each core, the server 200 can improve performance of a process other than a storage process or suppress power consumption while maintaining I/O performance. In addition, by changing a storage process in the occupied mode from the occupied mode to the shared mode based on a state of each process and each core, the server 200 can improve performance of a process other than the storage process or suppress power consumption while maintaining I/O performance. Furthermore, using an occupied mode change condition enables the server 200 to change a single storage process from the occupied mode to the shared mode. In addition, using a shared mode reduction condition enables the server 200 to reduce storage processes in the shared mode among the plurality of storage processes. Furthermore, using an occupied mode reduction condition enables the server 200 to reduce one of a plurality of storage processes in the occupied mode.

Moreover, an execution control program including at least a part of the monitoring program 550, the interrupt processing program 520, and the scheduler 530 may be used. The execution control program causes at least one of a plurality of processor cores to execute execution control which allocates at least one of the plurality of processor cores to each of a storage control process and an application process. The execution control causes a processor core allocated to the storage control process to be occupied by the storage control process. The execution control causes a processor core allocated to the application process to be shared by other processes. The execution control changes the number of processor cores allocated to the storage control process based on I/O information which represents a state of I/O. In addition, the storage program 540 may be referred to as a storage control program.

Hereinafter, a method by which a manager configures the core increase/decrease policy management table 1100 and the allocated core number management table 1200 will be described.

FIG. 18 shows a GUI for configuration.

The management program 600 of the management computer 210 provides the manager with a GUI 1900 for system configuration. The manager uses the GUI 1900 to issue instructions related to system configuration to the server 200.

The GUI 1900 includes a core increase/decrease policy configuration unit 1910, an allocated core number configuration unit 1920, an update button 1930, and a cancel button 1940.

The core increase/decrease policy configuration unit 1910 displays information in the core increase/decrease policy management table 1100 stored in the server 200 or accepts an input thereof. The core increase/decrease policy configuration unit 1910 includes the policy item 1111, the upper limit 1112, and the lower limit 1113 in a similar manner to the core increase/decrease policy management table 1100. The policy item 1111 of each entry represents any one of an average processing load, an average Write Pending rate, and an average response time. The upper limit 1112 and the lower limit 1113 display current values and, at the same time, enable the values to be edited.

The allocated core number configuration unit 1920 displays information in the allocated core number management table 1200 stored in the server 200 or accepts an input thereof. The allocated core number configuration unit 1920 includes the total number of cores 1211, the minimum number of occupied cores 1212, the maximum number of occupied cores 1213, and the maximum number of shared cores 1214 in a similar manner to the allocated core number management table 1200.

The total number of cores 1211 represents the number of cores in the server 200. The minimum number of occupied cores 1212, the maximum number of occupied cores 1213, and the maximum number of shared cores 1214 display current values and, at the same time, enable the values to be edited.

When the manager presses the update button 1930, the management computer 210 notifies the server 200 of updated contents in the core increase/decrease policy configuration unit 1910 and the allocated core number configuration unit 1920. The server 200 having received the updated contents updates the core increase/decrease policy management table 1100 and the allocated core number management table 1200 based on the updated contents.

When the manager presses the cancel button 1940, the management computer 210 ends system configuration and closes the GUI 1900.

Moreover, the GUI 1900 may include any one of the core increase/decrease policy configuration unit 1910 and the allocated core number configuration unit 1920.

By using the core increase/decrease policy configuration unit 1910 in the GUI 1900, the manager can configure conditions for executing the allocated core addition processing and the allocated core reduction processing. In addition, by using the allocated core number configuration unit 1920 in the GUI 1900, the manager can control operations of the allocated core addition processing and the allocated core reduction processing.

While an embodiment of the present invention has been described above, it is to be understood that the described embodiment merely represents an example for illustrating the present invention and that the scope of the present invention is not limited to the configuration described above. The present invention can be implemented in various other modes. For example, the present invention can be applied to information processing apparatuses such as a general-purpose computer or a server and to storage apparatuses such as a storage system.

REFERENCE SIGNS LIST

200 Server
210 Management computer
220 Network
230 Client
310 CPU
311 Core
320 Memory
330 HBA
340 NIC
350 Disk apparatus
410 CPU
420 Memory
440 NIC
450 Secondary storage device
470 Input device
480 Display device
510 Application program
520 Interrupt processing program
530 Scheduler
540 Storage program
550 Monitoring program
560 Storage cache
600 Management program

The invention claimed is:

1. A computer system, comprising:
a memory;
a plurality of processor cores coupled to the memory; and
a storage device coupled to the plurality of processor cores, wherein
the memory is configured to store:
a storage control program which causes at least one of the plurality of processor cores to execute a storage control process in which an I/O is executed with respect to the storage device in accordance with an I/O request;
an application program which causes at least one of the plurality of processor cores to execute an application process in which the I/O request is issued; and
an execution control program which causes at least one of the plurality of processor cores to execute execution control in which at least one of the plurality of processor cores is allocated to each of the storage control process and the application process,
the execution control causes a processor core allocated to the storage control process to be occupied by the storage control process,
the execution control causes a processor core allocated to the application process to be shared with another process, and
the execution control changes the number of processor cores allocated to the storage control process, based on I/O information indicating a state of the I/O;
wherein:
the I/O information includes at least any one of an I/O load that is a load of the I/O, a response time of the I/O, and a write pending data amount that represents a size of data pending write to the storage device in the memory, and
the storage control process measures the I/O information and stores the I/O information in the memory;
when the I/O information satisfies an addition determination condition configured in advance, the execution control executes an addition determination for determining whether or not to increase the number of processor cores allocated to the storage control process and, when the I/O information does not satisfy the addition determination condition but the I/O information satisfies a reduction determination condition configured in advance, the execution control executes a reduction determination for determining whether or not to reduce the number of processor cores allocated to the storage control process;

the execution control configures any one of an occupied mode and a shared mode with respect to the storage control process, when configured in the occupied mode, the storage control process occupies a processor core allocated to the storage control process, and when configured in the shared mode, the storage control process shares a processor core allocated to the storage control process with a program other than the storage control process;

the execution control stores state information representing a state of each process and each processor core in the memory, and in the addition determination, when the state information satisfies an occupied mode addition condition configured in advance, the execution control starts a new storage control process in the occupied mode, and when the state information satisfies a shared mode addition condition configured in advance, the execution control starts a new storage control process in the shared mode;

in the reduction determination, when the state information satisfies a shared mode reduction condition configured in advance, the execution control stops a storage control process in the shared mode, when the state satisfies an occupied mode reduction condition configured in advance, the execution control stops a storage control process in the occupied mode, and when the state information satisfies an occupied mode change condition configured in advance, the execution control configures the shared mode to a storage control process in the occupied mode;

the storage control process determines whether or not the I/O request has been issued, and when determination is made that the I/O request has been issued, executes the I/O, and when the I/O is completed, repeats the determination of the I/O request, in the occupied mode, when determination is made that the I/O request has not been issued, the storage control process repeats the determination of the I/O request, and in the shared mode, when determination is made that the I/O request has not been issued, the storage control process transfers an execution authority of a processor core allocated to the storage control process to a process other than the storage control process.

2. The computer system according to claim 1, wherein the memory is configured to include a cache memory which stores data to be written to the storage device and data read from the storage device, and the write pending data amount is a Write Pending rate representing a proportion of the write pending data in the data stored in the cache memory.

3. The computer system according to claim 2, wherein the memory is configured to store an I/O load upper limit value, a response time upper limit value, an I/O load lower limit value, and a Write Pending rate upper limit value, the addition determination condition is a condition under which the I/O load is higher than the I/O load upper limit value or the response time is longer than the response time upper limit value, and the reduction determination condition is a condition under which the I/O load is lower than the I/O load lower limit value and the Write Pending rate is equal to or lower than the Write Pending rate upper limit.

4. The computer system according to claim 3, wherein the memory is configured to store a maximum number of occupied cores and a maximum number of shared cores, the occupied mode addition condition is a condition under which two or more processor cores are allocated to a standard process that is a process other than the storage control process, a load of the cores allocated to the standard process after reducing the cores allocated to the standard process is equal to or lower than a load upper limit value configured in advance, and the number of processes in the occupied mode is smaller than the maximum number of occupied cores, and the shared mode addition condition is a condition under which the state information does not satisfy the occupied mode addition condition and the number of processes in the shared mode is smaller than the maximum number of shared cores.

5. The computer system according to claim 4, wherein the memory is configured to store a minimum number of occupied cores, the occupied mode change condition is a condition under which the number of storage control processes in the occupied mode is 1 and the maximum number of shared cores is equal to or larger than 1, the shared mode reduction condition is a condition under which the number of storage control processes is equal to or larger than 2 and the number of storage control processes in the shared mode is equal to or larger than 1, and the occupied mode reduction condition is a condition under which the number of storage control processes is equal to or larger than 2, the number of storage control processes in the shared mode is 0, and the number of storage control processes in the occupied mode is larger than the minimum number of occupied cores.

6. The computer system according to claim 5, further comprising:

a display device coupled to the plurality of processor cores; and an input device coupled to the plurality of processor cores, wherein the display device is configured to display at least any one item of the minimum number of occupied cores, the maximum number of occupied cores, and the maximum number of shared cores, and the input device is configured to accept an input of a value of the item.

7. The computer system according to claim 3, further comprising:

a display device coupled to the plurality of processor cores; and an input device coupled to the plurality of processor cores, wherein the display device is configured to display at least any one item of the I/O load upper limit value, the response time upper limit value, the I/O load lower limit value, and the Write Pending upper limit value, and the input device is configured to accept an input of a value of the item.

8. The computer system according to claim 1, wherein
the storage control process measures the number of cycles of a processor core allocated to the storage control process before the I/O and after the I/O, respectively, and measures the I/O load, based on the measured numbers of cycles.

9. A process execution method of causing a computer system to execute a process, the computer system including a memory, a plurality of processor cores coupled to the memory, and a storage device coupled to the plurality of processor cores, the process execution method comprising:
storing, in the memory, a storage control program which causes at least one of the plurality of processor cores to execute a storage control process in which an I/O is executed with respect to the storage device in accordance with an I/O request, an application program which causes at least one of the plurality of processor cores to execute an application process in which the I/O request is issued, and an execution control program which causes at least one of the plurality of processor cores to execute execution control in which at least one of the plurality of processor cores is allocated to each of the storage control process and the application process;
implementing the execution control to cause a processor core allocated to the storage control process to be occupied by the storage control process;
implementing the execution control to cause a processor core allocated to the application process to be shared with another process; and
implementing the execution control to change the number of processor cores allocated to the storage control process, based on I/O information indicating a state of the I/O.

10. A computer system, comprising:
a memory;
a plurality of processor cores coupled to the memory; and
a storage device coupled to the plurality of processor cores, wherein
the memory is configured to store:
a storage control program which causes at least one of the plurality of processor cores to execute a storage control process in which an I/O is executed with respect to the storage device in accordance with an I/O request;
an application program which causes at least one of the plurality of processor cores to execute a first application process in which the I/O request is issued from a plurality of application processes; and
an execution control program which causes at least one of the plurality of processor cores to execute execution control in which at least one of the plurality of processor cores is allocated to each of the storage control process and the application process,
the execution control causes the at least one of the plurality of processor cores allocated to the first application process to be shared by the plurality of application processes, the first application process issues the I/O request to the storage control process,
the execution control causes a processor core allocated to the storage control process to be occupied by the storage control process, the storage control process detects issuing the I/O request by polling and executes the I/O of the detected I/O request, and
the execution control acquires a proportion of a load between the polling and the I/O of the storage control process and changes the number of processor cores allocated to the storage control process, based on the acquired proportion of the load between the polling and the I/O.

11. A process execution method of causing a computer system to execute a process, the computer system including a memory, a plurality of processor cores coupled to the memory, and a storage device coupled to the plurality of processor cores, the process execution method comprising:
managing, in the memory, a storage control program which causes at least one of the plurality of processor cores to execute a storage control process in which an I/O is executed with respect to the storage device in accordance with an I/O request;
managing, in the memory, an application program which causes at least one of the plurality of processor cores to execute a first application process in which the I/O request is issued from a plurality of application processes; and
managing, in the memory an execution control program which causes at least one of the plurality of processor cores to execute execution control in which at least one of the plurality of processor cores is allocated to each of the storage control process and the application process,
causing, through the execution control, the at least one of the plurality of processor cores allocated to the first application process to be shared by the plurality of application processes, the first application process issues the I/O request to the storage control process,
causing, through the execution control, a processor core allocated to the storage control process to be occupied by the storage control process, the storage control process detects issuing the I/O request by polling and executes the I/O of the detected I/O request, and
acquiring, through the execution control, a proportion of a load between the polling and the I/O of the storage control process and changes the number of processor cores allocated to the storage control process, based on the acquired proportion of the load between the polling and the I/O.

12. A computer system, comprising:
a memory;
a plurality of processor cores coupled to the memory; and
a storage device coupled to the plurality of processor cores, wherein
the memory is configured to store:
a storage control program which causes at least one of the plurality of processor cores to execute a storage control process in which an I/O is executed with respect to the storage device in accordance with an I/O request;
an application program which causes at least one of the plurality of processor cores to execute an application process in which the I/O request is issued; and an execution control program which causes at least one of the plurality of processor cores to execute execution control in which at least one of the plurality of processor cores is allocated to each of the storage control process and the application process,
the execution control causes a processor core allocated to the storage control process to be occupied by the storage control process,
the execution control causes a processor core allocated to the application process to be shared with another process, and
the execution control changes the number of processor cores allocated to the storage control process, based on I/O information indicating a state of the I/O.

13. The computer system according to claim 12, wherein
the I/O information includes at least any one of an I/O load that is a load of the I/O, a response time of the I/O, and a write pending data amount that represents a size of data pending write to the storage device in the memory, and the storage control process measures the I/O information and stores the I/O information in the memory.

14. The computer system according to claim 13, wherein
when the I/O information satisfies an addition determination condition configured in advance, the execution control executes an addition determination for determining whether or not to increase the number of processor cores allocated to the storage control process and, when the I/O information does not satisfy the addition determination condition but the I/O information satisfies a reduction determination condition configured in advance, the execution control executes a reduction determination for determining whether or not to reduce the number of processor cores allocated to the storage control process.

15. The computer system according to claim 14, wherein
the execution control configures any one of an occupied mode and a shared mode with respect to the storage control process, when configured in the occupied mode, the storage control process occupies a processor core allocated to the storage control process, and when configured in the shared mode, the storage control process shares a processor core allocated to the storage control process with a program other than the storage control process.

16. The computer system according to claim 15, wherein
the execution control stores state information representing a state of each process and each processor core in the memory, and in the addition determination, when the state information satisfies an occupied mode addition condition configured in advance, the execution control starts a new storage control process in the occupied mode, and when the state information satisfies a shared mode addition condition configured in advance, the execution control starts a new storage control process in the shared mode.

17. The computer system according to claim 16, wherein
in the reduction determination, when the state information satisfies a shared mode reduction condition configured in advance, the execution control stops a storage control process in the shared mode, when the state satisfies an occupied mode reduction condition configured in advance, the execution control stops a storage control process in the occupied mode, and when the state information satisfies an occupied mode change condition configured in advance, the execution control configures the shared mode to a storage control process in the occupied mode.

* * * * *